(12) United States Patent
Reynolds et al.

(10) Patent No.: US 7,578,109 B2
(45) Date of Patent: Aug. 25, 2009

(54) SPACE FRAMES AND CONNECTION NODE ARRANGEMENT FOR THEM

(75) Inventors: Glenn A. Reynolds, Long Beach, CA (US); Dean R. Hackbarth, San Pedro, CA (US); Gary N. Curtis, Anacortes, WA (US)

(73) Assignee: Gossamer Space Frames, Huntington Beach, CA (US)

( * ) Notice: Subject to any disclaimer, the term of this patent is extended or adjusted under 35 U.S.C. 154(b) by 0 days.

(21) Appl. No.: 11/525,721

(22) Filed: Sep. 22, 2006

(65) Prior Publication Data

US 2007/0011983 A1     Jan. 18, 2007

Related U.S. Application Data

(63) Continuation-in-part of application No. 10/932,173, filed on Aug. 31, 2004.

(51) Int. Cl.
    *E04H 12/00*     (2006.01)
(52) U.S. Cl. ......................................... 52/648.1; 52/638
(58) Field of Classification Search .................. 52/81.3, 52/648.1, 638, DIG. 10
See application file for complete search history.

(56) References Cited

U.S. PATENT DOCUMENTS

| | | | |
|---|---|---|---|
| 2,284,898 A | 6/1942 | Hartman | |
| 3,421,280 A | 1/1969 | Attwood et al. | |
| 3,466,824 A | 9/1969 | Troutner | |
| 3,688,461 A | 9/1972 | Rensch | |

(Continued)

OTHER PUBLICATIONS

Ariel Hanaor, Special Issue on "Prefabricated Spatial Frame Systems", International Journal of Space Structures, vol. 10 No. 3 1995, 55 Pages; Multi-Science Publishing Co., Ltd.; UK.

*Primary Examiner*—Richard E Chilcot, Jr.
*Assistant Examiner*—Jessica Laux
(74) *Attorney, Agent, or Firm*—Christie, Parker & Hale, LLP.; Hayden A. Carney; Robert A. Green

(57) ABSTRACT

A node connector in a double layer grid-type of space frame preferably is an extrusion which includes an open-ended tubular portion for snugly at least substantially encircling a frame chord member of desired cross-sectional configuration which is disposable in the passage. The node connector has fixed external elements which extend along the connector parallel to the passage. Those elements define facing parallel flat surfaces arranged in at least two pairs of such surfaces. The surfaces of each pair lie equidistantly from a center plane between them. Each center plane is parallel to the passage axis and preferably includes the passage axis. Each pair of facing flat surfaces of the node connector can cooperate closely with opposite flat surfaces at the end of each of other frames framing member placed between the facing surfaces. The node connector can be secured to a chord member in its passage and to ends of other framing members by shear pins which have zero clearances in node connector holes and in holes or passages through the respective framing members. The space frame can be a movable armature for a curved solar reflector, the space frame having a V-shaped major surface.

At least some of the framing members can be thin wall tubes modified to have opposing, flat-exterior wall zones along the length of each tube and in which the wall thickness is locally increased and through which shear pin holes are defined.

31 Claims, 29 Drawing Sheets

U.S. PATENT DOCUMENTS

| | | | |
|---|---|---|---|
| 3,861,107 A | 1/1975 | Papayoti | |
| 3,914,063 A | 10/1975 | Papayoti | |
| 3,999,351 A * | 12/1976 | Rensch | 52/648.1 |
| 4,070,847 A | 1/1978 | Madl, Jr. | |
| 4,122,646 A | 10/1978 | Sapp | |
| 4,211,044 A * | 7/1980 | Gugliotta et al. | 52/200 |
| 4,312,326 A | 1/1982 | Johnson, Jr. | |
| 4,449,843 A * | 5/1984 | Wendel | 403/173 |
| 4,476,662 A | 10/1984 | Fisher | |
| 4,592,671 A | 6/1986 | Daum | |
| 4,904,108 A * | 2/1990 | Wendel | 403/173 |
| 5,022,209 A | 6/1991 | Kimura | |
| 5,375,389 A | 12/1994 | Kimura | |
| 2006/0053726 A1 | 3/2006 | Reynolds et al. | 52/633 |

* cited by examiner

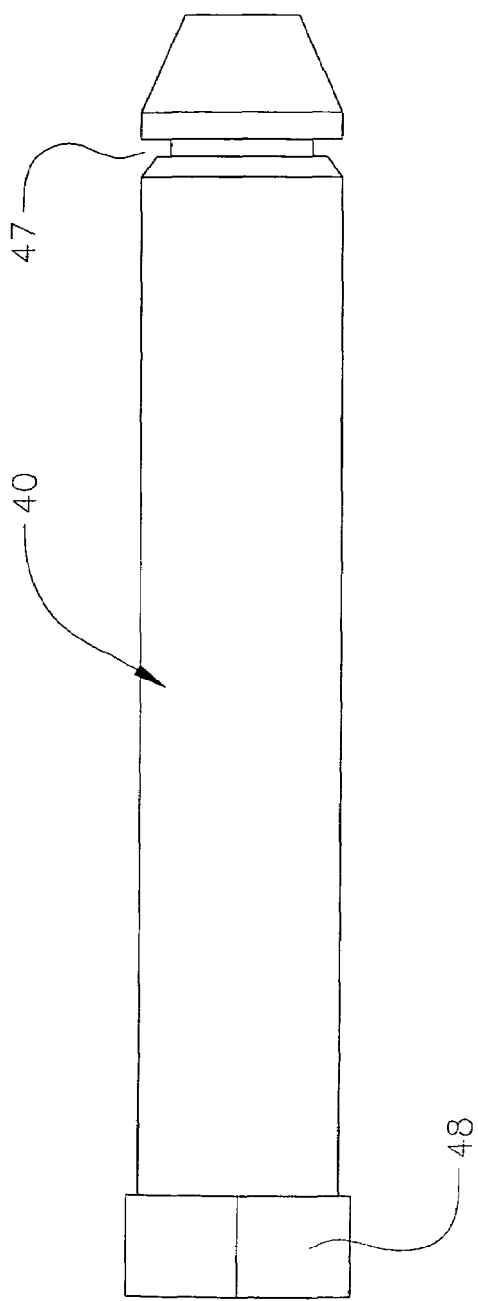

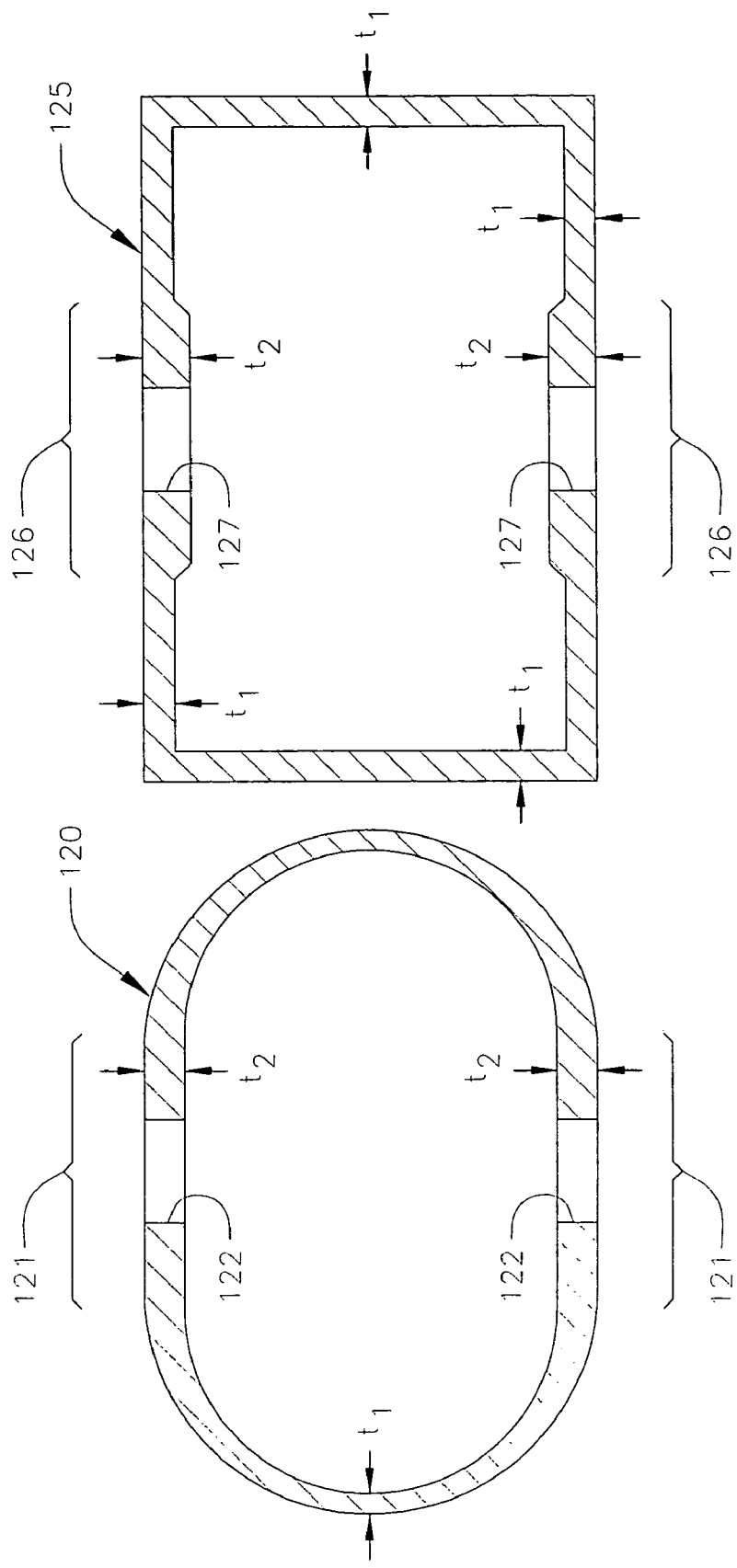

SPACE FRAMES AND CONNECTION NODE ARRANGEMENT FOR THEM

CROSS-REFERENCE TO RELATED APPLICATION

This application is a continuation-in-part under 35 U.S.C. §120 of co-pending application Ser. No. 10/932,173 filed Aug. 31, 2004.

FIELD OF INVENTION

This invention pertains to structural space frames. More particularly, it pertains to other-than-shell space frames and to connection node arrangements and other structural elements for such frames.

BACKGROUND OF THE INVENTION

A space frame is a network of structural framing members, such as tubes, interconnected at multi-member connection points (commonly called "nodes") in such a way that the whole structure behaves as one structural element. By contrast, in the typical framing of beams and columns, as in buildings, structural elements often act independently of each other and can have completely separate force paths.

Two broad classes of space frames are recognized in the art. They are single layer grids and double (multiple) layer grids (DLGs). A single layer grid is a network (arranged on a triangular, rectangular or other geometric scheme) of node structures and structural members of desired cross-sections and sizes. A single layer grid achieves its structural strength by locating the grid elements in a curved surface. Thus, single layer grids are most commonly used to define domes, vaults, and other constructions having simple or compound curvature.

Double layer grids, as the name implies, are space frames in which the nodes are located in two separate surfaces which commonly are flat and in parallel spaced relation to each other; vaulted DLGs having curved parallel spaced surfaces also are known. In a double layer grid (DLG), the nodes are interconnected in each surface by straight structural elements called chords; the chords in each surface are arranged in repeating geometric patterns which usually are squares, but triangles and rectangles also can be defined by the chord array in each surface. The squares (or other geometric shapes) defined by the chords in the principal surfaces of a DLG normally are of the same size throughout the structures. The two surfaces of a DLG are interconnected by further straight structural elements which are referred to herein as struts to distinguish them from the chord elements which lie in the principal surfaces of a DLG. The nodes in a top surface of a DLG are located so that the centroid of the area of the square, e.g., they define is located over a node in the bottom surface of the DLG, and struts are connected from each of those top surface nodes to that bottom surface node. As a result, the struts in a DLG which extend between the principal surfaces of the DLG are oblique to the principal surfaces.

Space frames are routinely used as static structures, i.e., structures which are mounted on and supported by fixed supports or foundations. DLG structures which are square or rectangular in overall plan view (i.e., as seen from a vantage point on a line perpendicular to the DLGs principal surfaces) can be supported at the ends of the structure or at the mid-length, e.g., of the structure. However, it is known to use space frames as movable covers over sports arenas and stadiums, in which case the space frame supports are carried on roller or trolley units which are movable along horizontal tracks; space frames used in such situations are fundamentally static structures because the movement of such a space frame does not significantly alter the frame loads due to gravity.

The connections of framing members to nodes in a single layer grid rarely are anything other than rigid connections defined by bolting, riveting or welding of the associated framing members to each other or to other node elements at a node. Such rigid connections of framing members at grid nodes enables the connections to transmit to the nodes, and to other members at the node, moment loads on the framing members; moment loads are loads which act on a framing member in ways which cause the framing member to tend to rotate or pivot relative to the node. In modern double layer grids, on the other hand, the connections of the framing members to the nodes rarely are moment connections; they are connections which either are true pinned connections or are connections which are modeled as pinned connections. In a double layer grid, loads on the overall grid which would tend to produce rotational movements of framing members relative to the nodes are resisted by tensile or compressive forces which act in the framing members along their lengths, i.e., axially of the framing members. The reason for the use of pinned connections in DLGs is the cost and difficulty of assembling such grids having moment connections of the framing members at or to the nodes.

A true pinned connection of a DLG framing member at a node is a simple connection to define and to make. Such a connection typically is made by passing a bolt or a pin through aligned holes in a framing member and in a node connector arrangement to which that framing member and other framing members are pinned. To the extent that strut axes do not intersect the axes of the chords at the node (or the axis of a major chord at the node), the node is said to have eccentricity. Eccentricity at a DLG node causes the node to have moment loads or other undesired loads applied to it. The presence of moment loads at nodes of a DLG requires that at least some of the components of the grid be heavier than if no moment loads were present. Load eccentricity at a DLG node can be caused by imperfections in the alignments of the framing member coupled to the node, and framing member misalignments can be produced by clearances in the pinned connections at the node. Clearances at pinned connections in a DLG also can cause the grid framing members to have effective lengths between nodes which deviate from design lengths, thereby affecting the magnitudes of the actual loads in the framing members as compared to design load magnitudes. The solution to the existence of (or potential for) differences between actual and design framing member loads is to make the framing members heavier.

It is apparent, therefore, that existing structures and techniques for establishing connections of framing members to nodes in DLGs have deficiencies which adversely affect the load carrying capacities of an overall DLG and of the framing members present in it. Needs exist for structures and procedures by which pinned connections at nodes in DLGs can be made with reduced or no eccentricity and with minimal effects of clearances at the pinned connections. Meaningful satisfaction of any or all those needs can result in DLGs which make more efficient use of their framing members and so permit weights of framing members to be reduced, along with other consequent benefits and advantages. The principal factors effecting the cost of a given DLG are primarily the cost of the materials used to define the grid components and secondarily the cost of labor to assemble those components. Material cost is a function of material weight. Labor costs are a function principally of the man-hours needed to assemble a DLG.

SUMMARY OF THE INVENTION

The invention beneficially addresses the needs identified above. It does so by providing structural arrangements and procedures which described in detail below, along with descriptions of the several benefits and advantages of those structures and procedures. Principal aspects of the invention as claimed are summarized next below.

This invention provides a node connector structure which is useful in defining interconnections of plural framing members at a node in a double layer grid type of space frame. The node connector comprises a cylindrical base portion defining a passage having an axis. The passage is sized and shaped for snug slideable substantially axial insertion into it of an elongate chord framing member, the chord member having an axis along its length which is substantially alignable with the passage axis upon insertion of the chord member into the passage. The passage is configured to substantially enclose the chord framing member and to hold the framing member axis in alignment with the passage axis upon insertion of the framing member into the passage. The node connector carries substantially along the length of and externally of the base portion plural fixed structural elements which define at least two pairs of parallel, spaced, opposing substantially flat surfaces. The surfaces of each pair are spaced equidistantly from a center plane between then; the center plane is parallel to and substantially intersects the passage axis. At least one pair of holes is defined in the base portion; those holes are aligned on a line which transverses the passage axis and is normal to it. At lease one pair of further holes is defined through the elements which define each pair of parallel spaced opposing surfaces; those holes are aligned on a line which is normal to that pair of surfaces.

This invention also provides a pinned connection of a framing member in a double layer grid-type of space frame at a node of the frame via a node connector having elements which define a pair of spaced parallel substantially flat opposing surfaces. The framing member has at an end thereof, between the node connector opposing surfaces, its own substantially flat and substantially parallel opposite exterior surfaces which are spaced to have low clearance of the framing member end between the opposing node connector surfaces. A pin receiving passage is formed through the framing member along a line which is substantially normal to the framing member's parallel exterior surfaces. A pair of holes are formed through the node connector elements on a line substantially normal to the pair of opposing surfaces defined by those elements. A pin is insertable through the holes and the passage upon suitable placement of the framing member and between the opposing surfaces of the node connector. In that context, the pin is defined to have substantially an interference fit within the holes and the passage upon insertion of the pin into the holes and the passage.

This invention also provides a tubular structural member which has substantially constant cross-sectional size and configuration along its length. The member has a pair of parallel oppositely aligned flat areas in its exterior surface. The tubular member has a predetermined substantially uniform wall thickness except in a selected portion of each of the externally flat areas where the wall thickness is a selected amount greater than the predetermined wall thickness. A respective one of a pair of aligned holes is defined through the tube in each of the selected portions of greater tube wall thickness.

Also, this invention provides a movable support armature for a curved reflector of electromagnetic radiation. The armature is defined substantially as a double layer grid space frame having nonparallel major surfaces. The armature is comprised by plural parallel major chord framing members each of which has an elongate axis and is disposed in a frame major surface. Each major chord member extends parallel to an elongate extent of the frame. The major chord members include a pair of bottom major chord members essentially in a bottom one of the frame major surfaces, and three upper major chord members. The upper major chord members include a central chord member which is located between two outer chord members. The outer chord members lie in respective ones of two planes which also include the center chord member. The planes intersect at the center chord member at an oblique included angle which is concave away from the frame bottom plane. Node connector structures are connected to each major chord member at spaced locations along each member. Minor chord members are connected between corresponding nodes on the major chord members defining the respective planes described above to define rectangular arrays of major and minor chord members in each plane. Strut framing members are interconnected between nodes in different ones of the planes. Bracing framing members are connected between diagonally opposite nodes in each rectangular array.

BRIEF DESCRIPTION OF THE DRAWINGS

The previously mentioned and other aspects of this invention, and benefits, features and advantages of them, are more fully described and noted in the following detailed descriptions made with reference to certain structural and procedural embodiments of the invention which are depicted in the accompanying drawings in which:

FIG. 11 is an elevation view of a shear pin useful in making connections of space frame framing members to node connectors in the practice of aspects of this invention;

FIG. 12 is a plan view of a known style of clip retainer useful with the shear pin of FIG. 11;

FIG. 27 is a cross-sectional elevation view of a DLG framing member according to an aspect of the invention;

FIG. 28 is a cross-sectional elevation view of another DLG framing member which uses the same design principles on the framing member shown in FIG. 27;

DETAILED DESCRIPTION OF THE INVENTION

Figure 1:
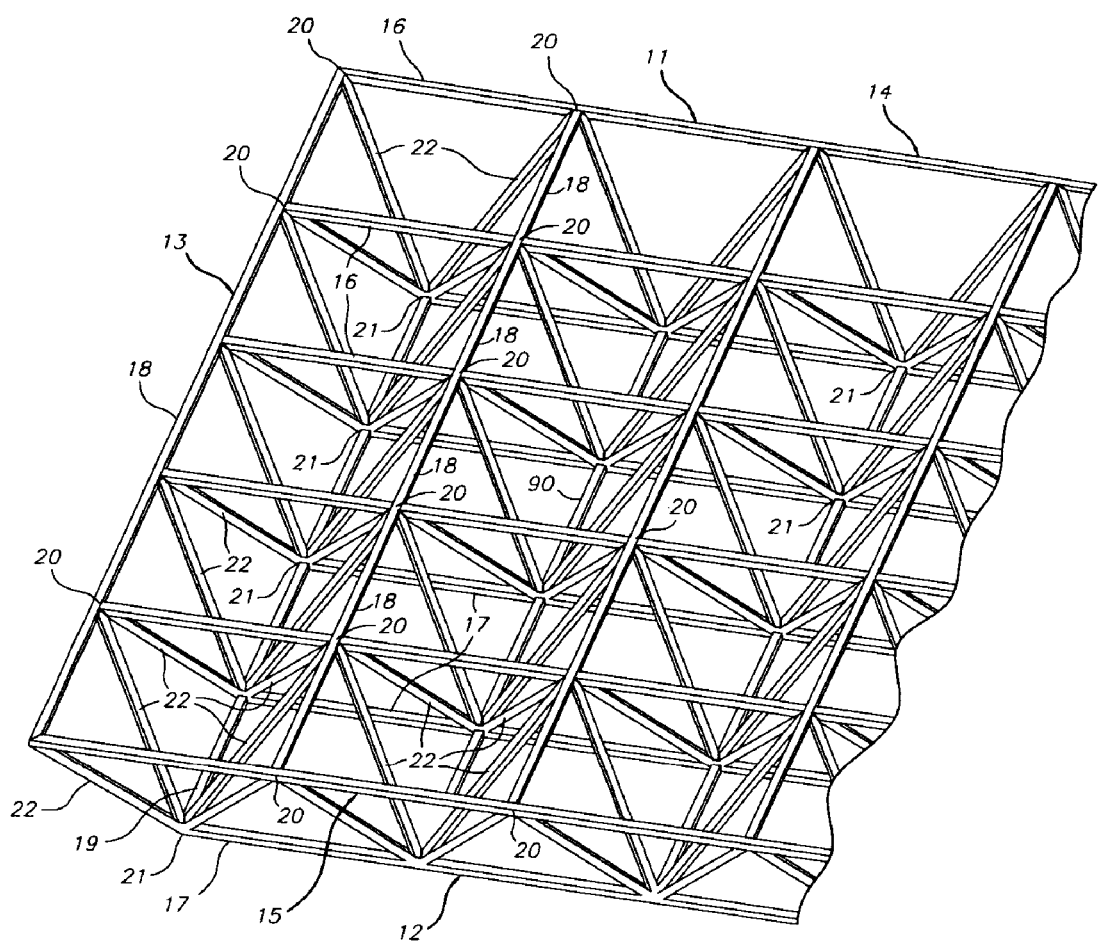
FIG. 1 is a perspective view of a double layer grid (DLG) space frame of indeterminate length and which has constant square bay spacing.

FIG. 1 is a perspective view of a portion of a rectilinearly subdivided DLG space frame 10. Frame 10 is composed of framing members which are disposed to define top 11 and bottom 12 layers of the frame and to interconnect those layers in an arrangement which causes frame layers 11 and 12 to be in spaced parallel relation to each other. Layers 11 and 12 can also be called grids, hence the name double layer grid (DLG) for the type of space frame shown in FIG. 1.

The framing members of DLG 10 are comprised by chords which are interconnected to define top and bottom layers 11 and 12 of the DLG which has an end 13 and opposite sides 14 and 15. The chords which extend along the length of the DLG can be and preferably are continuous (subject to limitations on the lengths available) and, for present purposes, are called major chords. Thus, DLG 10 includes upper major chords 16 and lower major chords 17. In each layer of DLG 10, the upper and lower major chords are interconnected and spaced by upper 18 and lower 19 transverse minor chords, each of which has a length equal (or essentially so) to the spacing between the major chords which they interconnect. The major and minor chords of DLG 10 are aligned to be parallel to respective orthogonal directions, i.e., the length and the width, of the DLG. In each layer, the major and minor chords are interconnected at junction points which are commonly called nodes. Thus, DLG 10 has upper nodes 20 and lower nodes 21. As is common in DLG, the distance in each layer between adjacent parallel minor chords is equal to the distance between adjacent parallel major chords, and so the upper nodes 20 and the lower nodes 21 are located at the corners of aligned rows and columns of squares bounded by the major and minor chords; each top layer square corresponds to a bay of the DLG; the chords in the bottom layer of frame 10 also define square bays. Thus, consistent with the foregoing, DLG 10 has constant square bay spacing.

If the spacing between adjacent parallel minor chords of a DLG is more or less than the spacing between adjacent major chords in a layer, the DLG is described as having constant rectangular bay spacing.

Chords 16 and 18 of DLG 10 can be said to be in (or to define) a top surface of the DLG; similarly, chords 17 and 19 are in (define) a bottom surface of the DLG. The top and bottom surfaces of DLG 10 are parallel.

The top and bottom layers of DLG 10 are spaced from and supported relative to each other by further diagonal framing members 22 called struts each of which extends between a top layer node 20 and a bottom layer node 21. In order that the upper and lower grids may be stiffly fixed relative to each other by the struts, the upper major and minor chords are offset relative to the lower major and minor chords in such manner that the lower nodes 21 are located vertically below the centers of the square openings defined by the chords of the upper grid; upper nodes 20 are located vertically above the centers of the openings defined by the chords of the lower grid. Thus, the struts are disposed in planes which are inclined relative to the top and bottom surfaces of frame 10. As shown in FIG. 1, within the boundaries of the frame, there are four struts 22 connected to each upper node 20 and to each lower node 21. As a result, the struts are disposed in two sets of parallel planes, one set parallel to and intersecting one upper major chord and one lower major chord, and one set parallel to and intersecting one line of upper minor chords and one line of lower minor chords. Along the ends and sides of frame 10, there are two struts 22 connected to each upper node 20, and the frame end and side surfaces (strut planes) slope down and inwardly between the top and bottom surfaces of the frame.

In the classic frame 10 shown in FIG. 1, there are fewer squares in bottom layer 12 than there are in top layer 11. As frame 10 is depicted in FIG. 1, the frame is six squares (bays) wide in its top layer and five squares (bays) wide in its bottom layer, while the length of the frame as depicted is indefinite. Such a DLG frame can be described by the notation 6×n/5×(n−1) in which 6×n denotes a top grid 6 bays wide by n bays long, and the notation 5×(n−1) denotes a bottom grid 5 bays wide by (n−1) bays long.

The description of frame 10 to this point has pertained to geometrical aspects of the frame, to the linear structural framing members which comprise the frame, and to the nodes where the lines (axes) of the different framing members intersect each other in an ideal frame. That description is a background and foundation for the following descriptions of actual frames and of the structures which are employed to interconnect framing members at nodes in those frames. The following descriptions include descriptions of node connector arrangements which enable the design and construction of DLG-type space frames having advanced properties and benefits.

Figure 2:
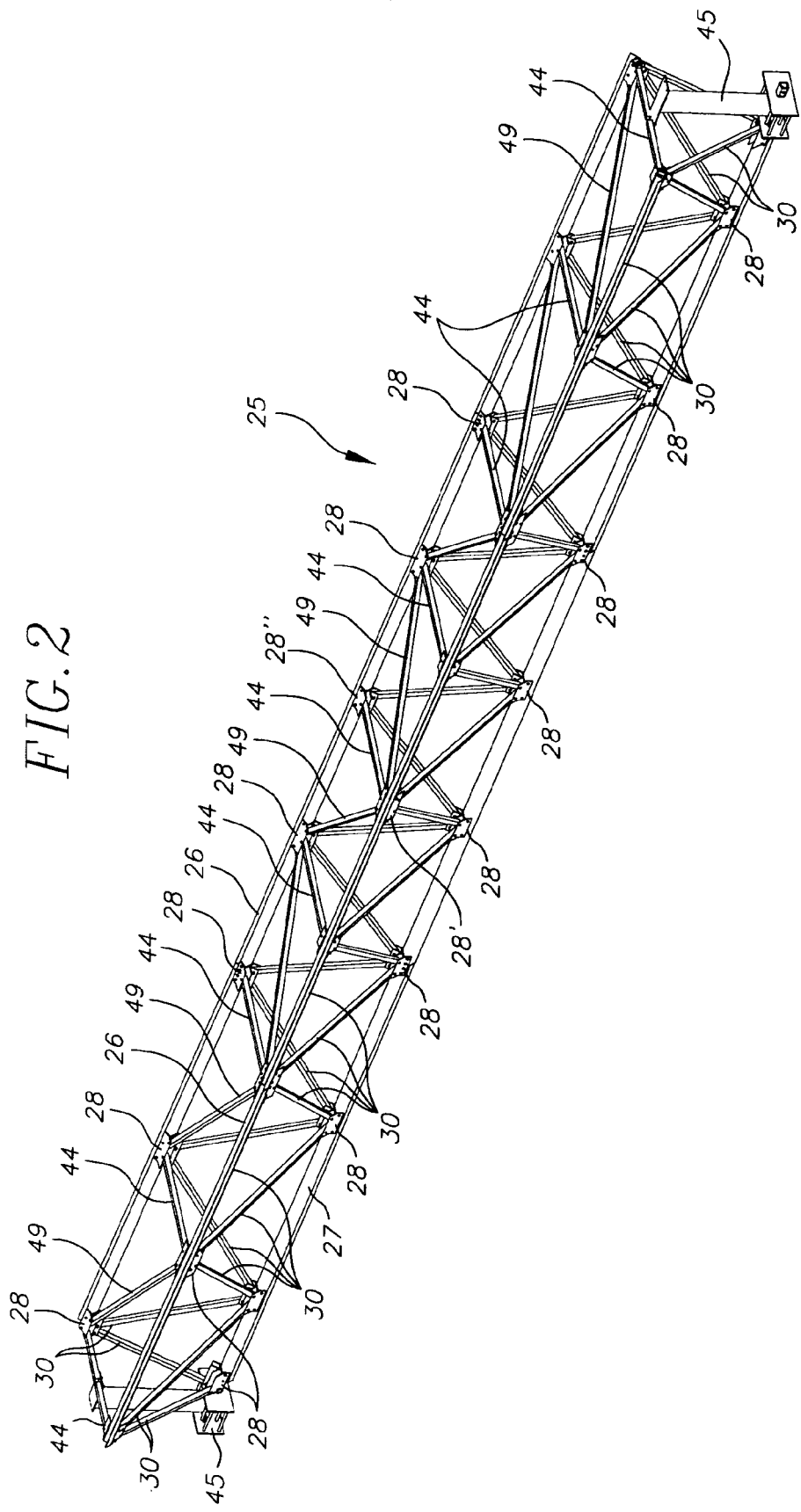
FIG. 2 is a perspective of a simple DLG space frame, in the nature of a triangular truss, which has variable bay spacing.

FIG. 2 is a perspective view of a DLG-type space frame 25 in the form of a truss of inverted equilateral triangular cross-section. Using the notation described above, frame 25 is a 1×8/0×0 DLG frame. Frame 25 has two upper major chords 26 and one lower major chord 27, all of which extend along the full length of the frame.

Figure 3:
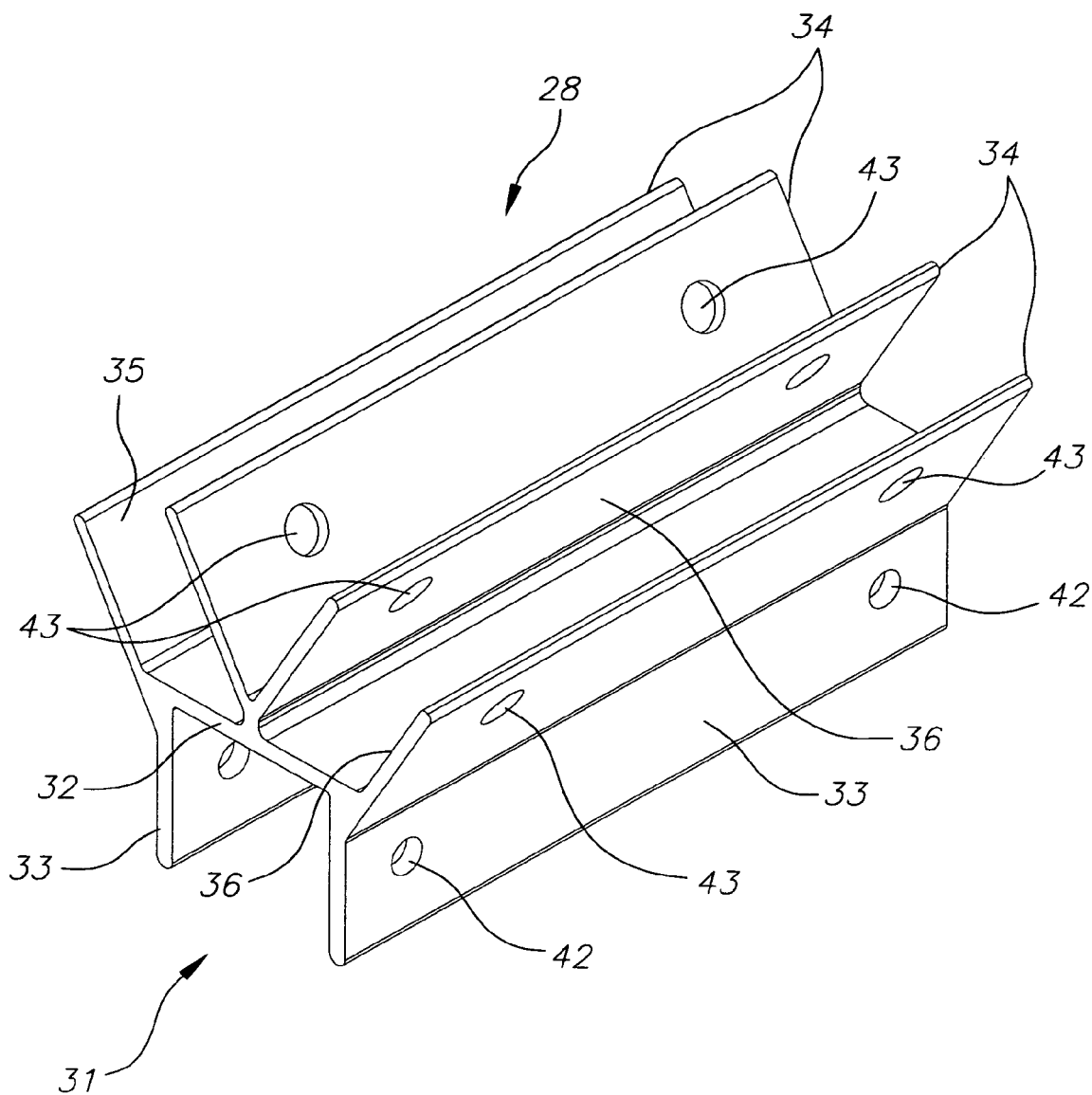
FIG. 3 is a perspective view of a node connector for the space frame shown in FIG. 2.
Figure 4:
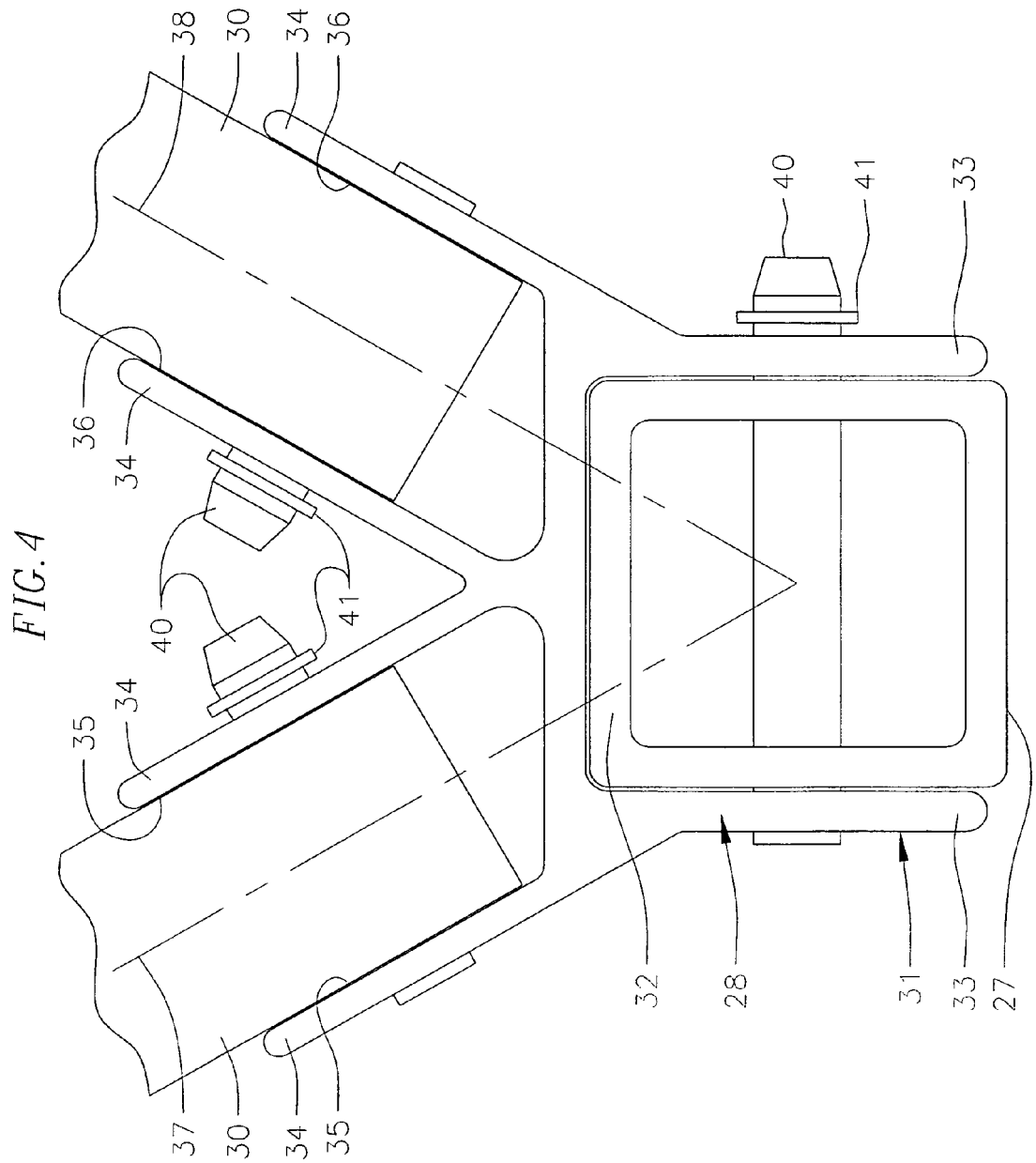
FIG. 4 is a fragmentary end elevation view of the node connector of FIG. 3 with connections of framing members to it in the construction of the space frame shown in FIG. 2.

FIGS. 3 and 4 show a node connector 28 of frame 25. Because the cross-sectional configuration of frame 25 is that of an equilateral triangle, a single basic node connector configuration can be used at all nodes in the frame. The framing members of frame 25 preferably are square tubes, the major chords preferably having cross-sections larger than the cross-sections of the other framing members (minor chords, struts, and torsion braces) present in the frame; the other framing members preferably are of the same cross-sectional dimensions. The frame material preferably is an extrudable aluminum alloy, and the framing members preferably are extruded aluminum tubes. Also, the node connectors 28 preferably are defined by extrusions of the same aluminum alloy.

FIG. 4 shows the pinned connection of two struts 30 to a node connector 28 which has a pinned connection to lower chord 27; a connection of struts to a node connector on either of the upper major chords would have substantially the same appearance as shown in FIG. 4 except that the upper major chords actually are turned about their longitudinal axes visualize that FIG. 4 is rotated 120° in either direction.

Node connector 28 has a chord-receiving base channel portion 31 which has a flat base 32 and two parallel spaced flanges 33 perpendicular to the base. The spacing between opposing faces of flanges 33 is slightly greater than the exterior width of a major chord, and the height of the flanges from the base 31 preferably is equal to the height of a major chord. Node connector 28 also carries along the exterior of the channel portion, in directions parallel to the length of the connector's channel portion, plural fixed structural elements (flanges or ribs) 34 which define two pairs of parallel spaced opposing and substantially flat surfaces 35 and 36. Surfaces 35 and surfaces 36 are spaced a distance which is slightly greater than the width of the extrusion from which the struts, minor chords and torsion braces of frame 25 are defined. Further, surfaces 35 are spaced parallel to and equally from opposite sides of a plane 37 which passes through the structural neutral axis of bottom chord 27 as received in and secured in the channel portion 31 of node connector 28 as shown in FIG. 4. Because chord 27 is defined by an extruded square tube of uniform wall thickness, the location of the neutral axis of the chord is coincident with the centroid of the cross-sectional area of the tubular chord. Similarly, surfaces 36 are spaced parallel to and equally from opposite sides of a plane 38 which passes through the neutral axis of chord 27 as received and secured in node connector 28. Thus, regardless of the angularity of a strut 30, as pinned to the node connector, relative to the length of the node connector, axial forces (tensile or compressive) in the truss are aligned with and pass through the neutral axis of the chord to which the node connector is fixedly (rigidly) mounted as by the use of shear pins. That is, because flanges 34 are parallel to the length of the node connector and have the described geometrical relations to the channel portion of the node connector, the assembled node connection is free of eccentricities regardless of the angularities of the pertinent struts relative to the chord.

Node connector 28 preferably is doubly pinned to chord 27 by use of shear pins 40 and clip retainers 41 as depicted in FIGS. 11 and 12. Double pinning of the connector to chord 27 provides a rigid connection between them; in a DLG a rigid connection of a node connector to at least one of the framing members engaging that node connector is important. To enable the node connector 28 to be doubly pinned to chord 27, the connector has two sets of shear pin holes 42 formed through channel portions flanges 33 at spaced locations along the length of the connector. The two holes 42 in each hole set are centered on a line which is normal to the length of the node connector and passes through the neutral axis of the chord 27 as secured in node connector. Similar shear pin holes are formed through the walls of chord 27 on a line perpendicular to the chord's length and passing, preferably, through the neutral axis of the chord. If the length of truss 10 exceeds the length at which chords 26 and 27 can be obtained or conveniently handled, node connectors 28 can be used to make splices between aligned chord member lengths. Splicing is accomplished by making a splicing node connector of extended length, and by doubly pinning the adjacent ends of two chord member lengths to the node connector.

In like manner, shear pin holes 43 are formed through node connector flanges 34 for each other framing member which is to be connected to that node connector in completed frame 25. In this instance, because each other framing member is simply (singly) pinned to the node connector, one hole 43 per each framing member to be connected to the connector is formed in each relevant flange 34, and the two holes in the coacting flanges are centered on a line which is perpendicular to flange surfaces 35 or 36. Similarly, two aligned shear pin holes are formed through the walls of each other framing member; they are located on a line perpendicular to the length of the framing member and passing, preferably, through the neutral axis of that member.

As shown in FIG. 2, upper major chords 26 and lower chord 27 of frame 25 are of equal length; compare the different lengths of major chords 16 and 17 in frame 10 shown in FIG. 1. Upper major chords 26 are located in spaced parallel relation to each other by minor chords 44 which are parallel to each other and perpendicular to the major chords, and so the upper major chords mount (as described above) node connectors 28 at their ends and at opposed locations spaced along their lengths. To afford connection points for the diagonal struts 30 in frame 10, node connectors 28 are fixedly mounted to lower chord 27 at locations between the ends of that chord which are, respectively, midway along the distance between corresponding upper minor chords 44. Also, to accommodate the mounting of frame support fittings 45 to the opposite ends of frame 25, an end node connector 28 is fixedly mounted to each end of lower chord 27.

As to each of node connectors 28 located between, rather than at, the ends of lower chord 27, four struts 30 are pinned to each connector; two of those struts have their ends snugly yet movably received between surfaces 35 of the connector so that the opposing flat exterior surfaces of the strut substantially register with surfaces 35, and another two of those struts have their ends snugly yet moveably received between surfaces 36 of the connector so that the opposing flat exterior surfaces of those struts substantially register with surfaces 36. The ends of struts 30 are pinned to the connectors 28 with which they cooperate by use of shear pins 40 passed through the strut-end holes and through holes 43 of the connector. All shear pins are held in place by connection of clip retainers 41 to the pins; each retainer cooperates with its pin in a circumferential recess (groove) 47 defined in the round pin shank adjacent a distal end of the pin which is opposite from an enlarged head 48 at the other end of the pin. Two struts 30 are connected from the node connector at each end of lower chord 27 to a corresponding frame end connector at the adjacent ends of upper major chords 26; see FIG. 2.

Further, to make frame 25 stiff against torsional or wracking loads imposed upon it in use, frame 25 includes a torsion brace framing member 49 in each bay of the frame; a bay of frame 25 is the opening bounded by the upper major chords 26 and two adjacent upper minor chords 44. Each torsion brace is connected between the node connectors at the diagonally opposite corners of a bay. The torsion braces lie in the plane of the upper minor chords, and so the torsion brace ends are simply (singly) pinned between the same surfaces 35 or 36 of each affected node connector between which an end of an upper minor chord 44 is similarly pinned. In the portion of frame 25 between its end bays, the torsion braces 49 alternate in the directions in which they are skewed to the length of the frame.

Attention is drawn to the node connectors denoted 28' and 28" in FIG. 2; they are at the opposite ends of a single upper minor chord 44. In addition to being associated with an upper major chord 26, connector 28' has associated with it two struts 30, an upper minor chord 44, and two torsion braces 49. Struts 30 can be received between surfaces 35 of connector 28' and framing members 44 (one) and 49 (two) can be received between surfaces 36 of that connector. By contrast, node connector 28" has associated with it an upper major chord, a minor chord 44, and two struts 30. To accommodate those differences in the number of connections to them, connector 28' has a length greater than that of connector 28" by an amount adequate to accommodate the ends of three framing members between surfaces 36 of connector 28'. That connector length difference is easily handled by making connector 28' from a longer length of the connector extrusion than the length of the extrusion section used to make connector 28", and by drilling three sets of holes 43 through the flanges forming surfaces 35 rather than one set of such holes.

It is a feature of frame 25 that all of the shear pin holes formed in each node connector 28 have the same design diameter (and preferably actual diameter) as the diameter of the cylindrical shanks of the shear pins to be inserted into those holes, and that the shear pin holes formed in all framing members of frame 25 also have the same design (also preferably actual) diameter as the shank diameter of the shear pins used to pin them to node connector 28. That is, each shear pin has zero clearance relative to the node connector and framing member holes through which its shank will be inserted to connect the relevant framing member to the relevant node connector. Such zero clearance means, as a practical matter, that each shear pin has an interference fit in each of the holes with which it coacts when installed in the frame. Such zero clearance of shear pins in connector and framing member holes means that frame 25 can be built with great precision and has no play or looseness in any of its connections. As noted above, the lack of play or looseness in the framing member connections in a space frame means that each framing member will experience and transmit loads which very closely correspond to design loads, and that all framing members will effectively share and correctly transmit loads and load forces within the frame. There will be minimal instances of some framing members carrying more or less of the fraction of the total loads they were designed to carry. Consequently, lower safety factors can be used in the design of frame 25 and correspondingly lighter framing members can be used than if the frame connections have play or looseness, without compromising safety or structural adequacy.

An inspection of FIG. 2 will reveal that it has 8 bays along its length, i.e., 8 intervals between 9 spaced upper minor chords 44. Such inspection of FIG. 2 will reveal that the 4 bays in the mid-length of the frame are of the same length, which length is less than the equal lengths of the other 4 bays of the frame. Thus, frame 25 has variable bay spacing; bay spacing in frame 25 can be defined as the distance along the length of the frame between the centroids of the rectangular areas on opposite sides of a minor chord. Variable bay spacing means that some node connectors are closer to each other along a given major chord than are others of the node connectors along that major chord. Because of the natures of the node connectors 28 as described above, all of the node connectors along that major chord can be (preferably are) made with the same transverse cross-sectional configuration, i.e., made by use of different pieces cut from a single extrusion. Variable bay spacing is possible with node connectors 28 because, in all of the node connectors, the elements of the connectors which define surfaces 35, 36 are arranged to be parallel to the length of the portion of the connector which cooperates with the major chord of the frame which can (preferably does) extend continuously through the connector. Variable bay spacing is easily achieved in frame 25 by varying the lengths of struts 30 and of torsion braces 49 as needed.

It is preferred that the node connectors and framing members of frame 25 be defined of the same material so that they all have the same coefficient of thermal expansion, thereby resulting in a frame which develops minimal stresses in it with temperature change and does not deflect or distort due to temperature changes. The preferred material for definition of the node connectors and framing members of frame 25 is an aluminum alloy, and those frame elements preferably are made by extrusion processes. Shear pins used in the connections within the frame can be made of aluminum or of stainless steel.

However, it is within the scope of this invention that the node connectors and framing members of frame 25, or of other frames according to this invention, can be made of other materials. If steel is the material of choice, it will be apparent that the node connectors can be fabricated out of discrete components preferably welded together into integral articles of manufacture. Pultruded materials such as fiber reinforced plastics (synthetic resins) can be used; in that connection, pultruded components are regarded as equivalents of extruded components. Both extruded and pultruded components can be used in a given frame according to this invention. Node connectors can be made by other fabrication processes such as casting or machining.

Regarding frame 25, it was noted that, because the overall cross-section configuration of the frame is that of an inverted equilateral triangle, all node connectors in the frame can have the same cross-sectional configuration. If the frame cross-sectional configuration were that of an isosceles triangle, then two different cross-sectional configurations would be needed for the node connectors. Similarly, if the frame configuration were to be that of a triangle having no equal included angles, three different node connector cross-sections would be required. The principles used in the design of node connectors 28 can be used in the design of node connectors for DLG-type space frames having other configurations than trusses of triangular cross-section. Square-section box trusses can be defined by a variation of node connectors 28 in which the central planes between surfaces 35 and 36 intersect each other at a 90° angle rather than a 60° angle. Moreover, a truss designed and constructed according to this invention can be disposed vertically to serve as a tower. Different node connector cross-sections are readily accommodated in the practice of this invention, as made more clear by the following descriptions.

Figure 5:
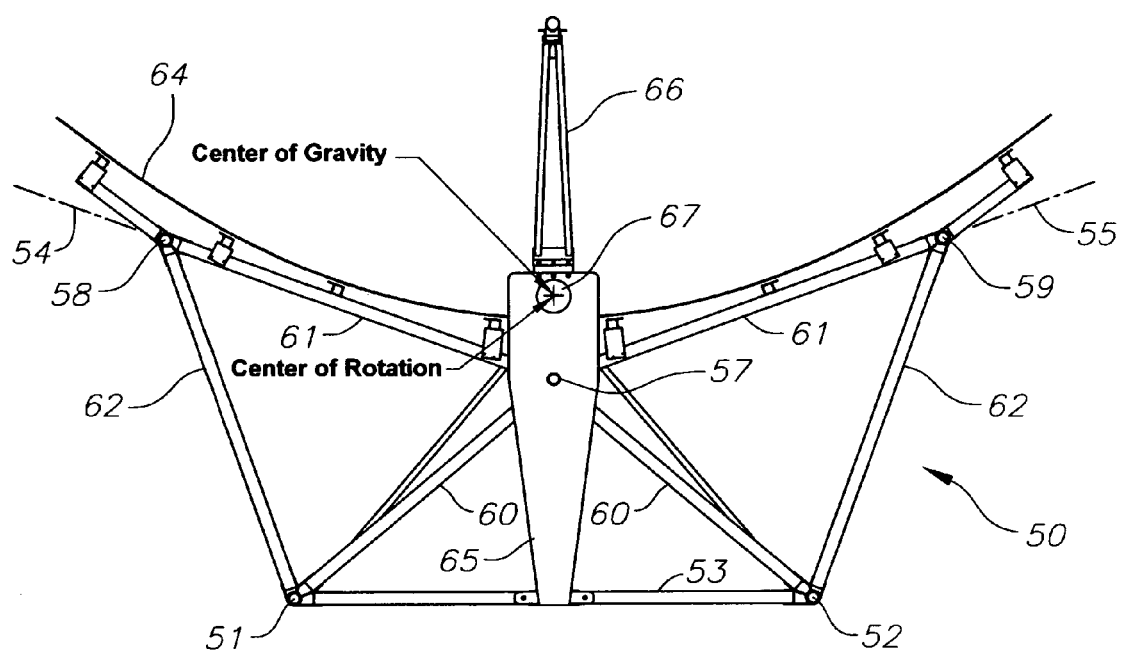
FIG. 5 is an end elevation view of a more complex DLG space frame which is a movable support armature for a curved mirror and is useful in a solar power generation installation.

FIG. 5 is an end view of another space frame 50 according to this invention. Frame 50 is a double layer grid (DLG) frame which has a flat bottom surface defined by two bottom major chords 51, 52 and bottom minor chords 53 which extend transversely of those major chords. The upper surface of frame 50 is not flat, but instead has the contour of a shallow V (oblique included angle) which is concave upwardly away from the frame's bottom surface; the frame is substantially symmetrical about a bisector plane of that included angle. The upper surface is defined by two planes 54, 55 which intersect at the axis of an upper central major chord 57. Two upper outer major chords 58, 59 are located equidistantly from and on opposite sides of center chord 57 and lie, respectively, in planes 54 and 55. Upper center major chord 57 is positioned centrally above and parallel to bottom major chords 51, 52 by central struts 60 of equal length. Each of upper outer major chords 58, 59 is positioned relative to the upper central major chord and to the adjacent bottom major chord by upper minor chords 61 and by struts 62 which are longer than central struts 60. The major chords of frame 50 preferably are defined by round tubes. The minor chords, struts, torsion braces and auxiliary framing members (see the following descriptions) preferably are defined by square tubes. The tubes (round and square) preferably are defined by aluminum extrusions, as are all of the three different styles of node connectors at which the framing members of frame 50 are interconnected.

The intended use of frame 50 is as a movable support armature for an elongate preferably cylindrically curved mirror 64 in a solar power generation facility; the position of a mirror 64 relative to the frame is shown in FIG. 5. To enable the frame to serve in that capacity, the frame is designed and constructed to carry a mounting and torque transmitting arm 65 at each of its ends, and to carry supports 66 for tubes through which a liquid is circulated to be heated by solar radiation reflected by the mirror. The complete mirror and mirror support frame assembly has a center of gravity and a center of rotation which are coincident at 67 in arms 65.

In light of the foregoing descriptions of truss frame 25 and its node connectors 28, it will be apparent that frame 50 includes three styles of node connectors which cooperate respectively with bottom major chords 51, 52, with upper center major chord 57, and with upper outer major chords 58, 59. Those three styles of node connectors are shown, respectively, in FIGS. 6 and 7, in FIGS. 8 and 9, and in FIG. 10.

Figure 6:
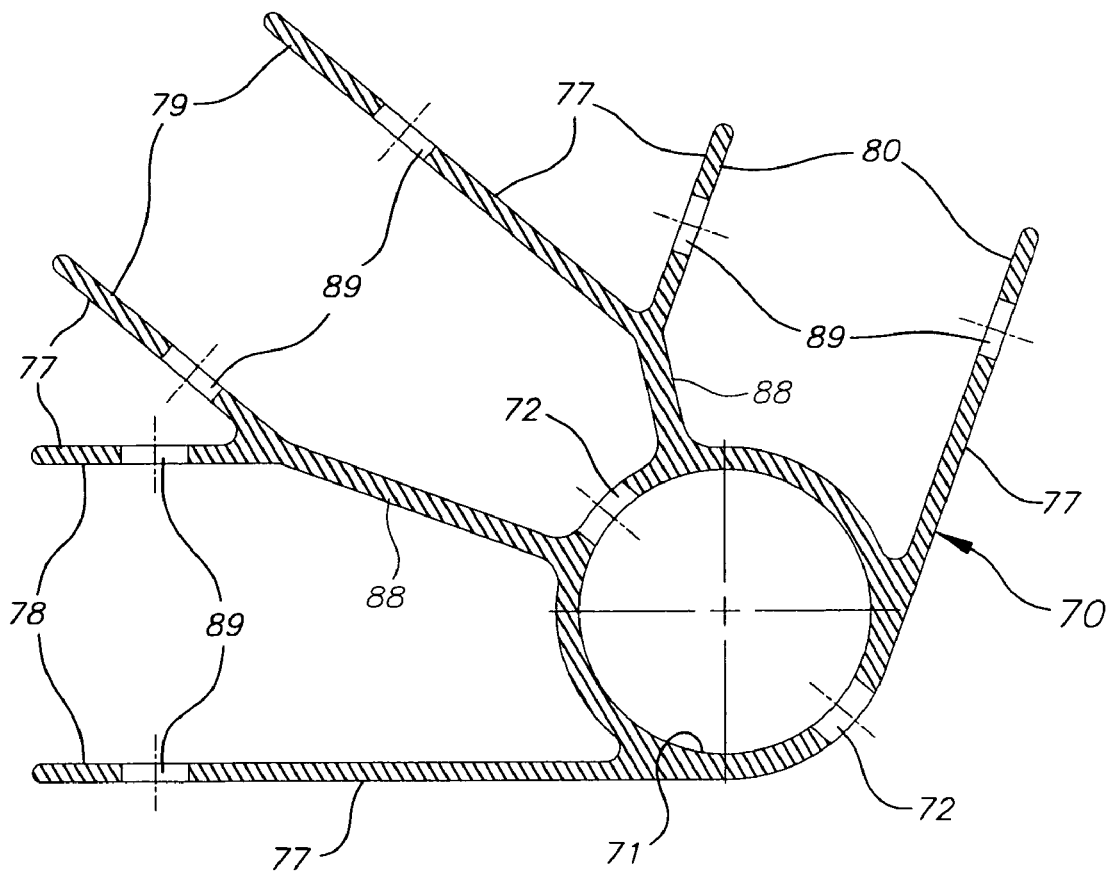
FIG. 6 is an end view of a first node connector configuration useful in the DLG shown in FIG. 5.
Figure 7:
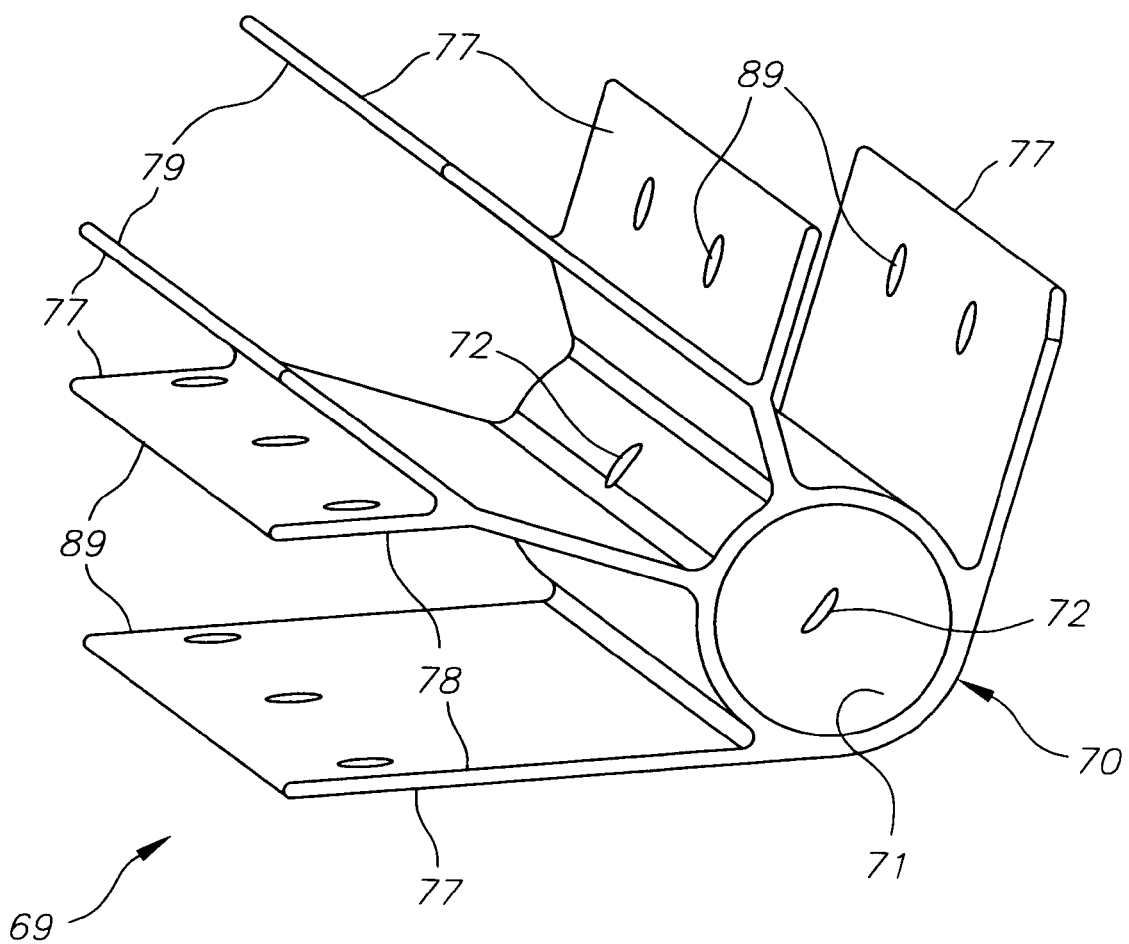
FIG. 7 is a perspective view of the node connector of FIG. 6.

Bottom major chord node connectors 69 have the cross-sectional configuration shown in FIG. 6. Unlike node connectors 28 in frame 25, node connectors 69 are configured for cooperation with a major chord framing member which is defined in the form of a round tube. A node connector 69 has a base circularly cylindrical chord engaging portion 70 which defines a round circumferentially closed passage 71 which extends along the length of the connector. The diameter of passage 71 is slightly greater than the outer diameters of the bottom major chords of frame 50 so that each connector enables a chord tube to be snugly and slidably inserted into and through the node connector. At least one pair (preferably two pairs) of holes 72, aligned on a diameter of passage 71, are formed through the connector's chord engaging portion to enable shear pins (preferably zero-clearance shear pins as described above) to be used with cooperating holes in the pertinent major chord tube to fixedly mount the connector to the chord tube. In other respects, however, node connectors 69, as well as upper central node connectors 74 (FIGS. 8 and 9) and upper outer chord node connectors 75 (FIG. 10) of frame 50, are sufficiently similar to node connectors 28 that, in view of the content of FIGS. 6-10, extended descriptions of frame 50's node connectors are not needed for an understanding of them by a person skilled in the art.

Figure 10:
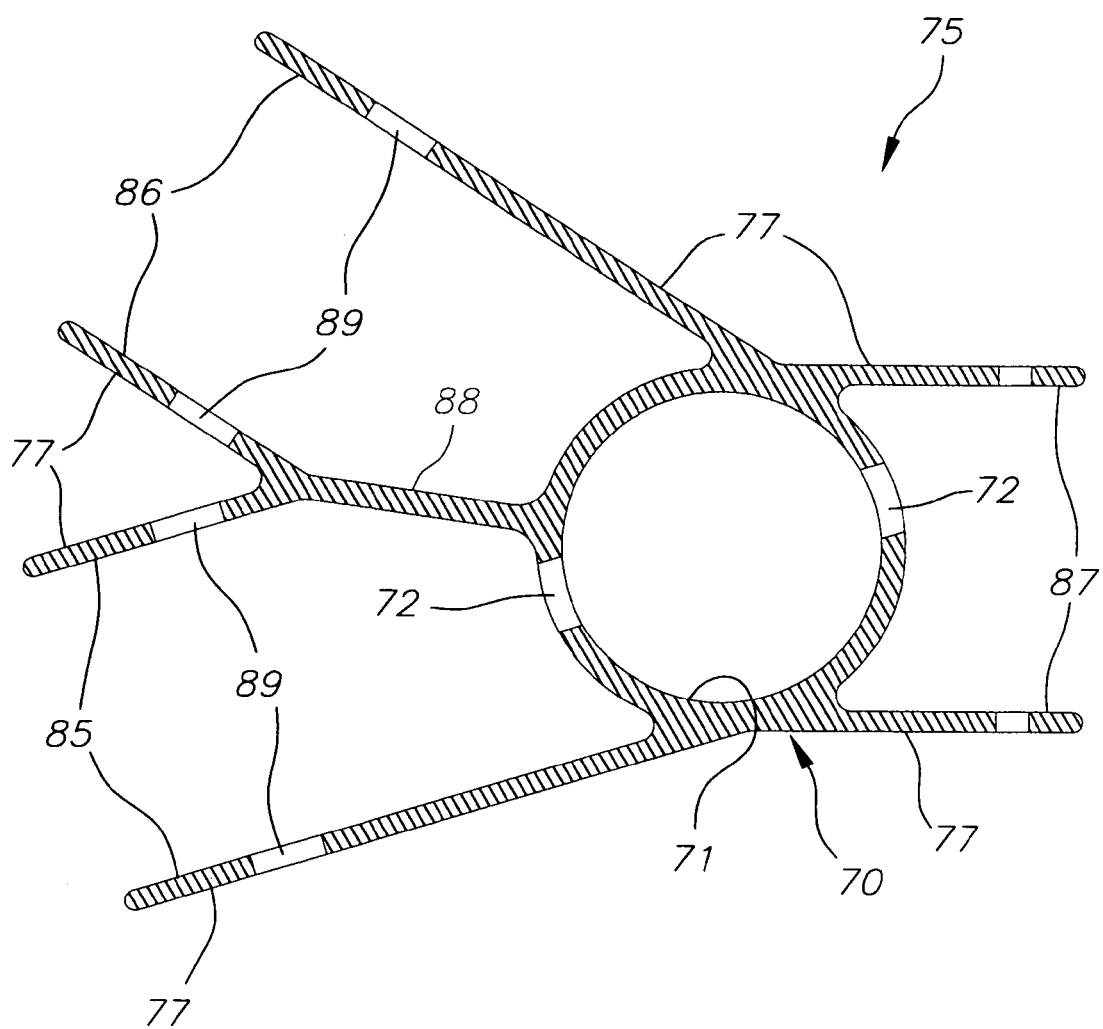
FIG. 10 is an end view of a third node connector configuration useful in the DLG shown in FIG. 5.

Therefore, briefly noted, each of major chord node connectors 69, 74 and 75 carries along its length and externally of its tubular chord engaging base portion 70 a plurality of fixed structural elements 77 which define plural pairs of parallel spaced opposing substantially flat surfaces 78, 79, 80 (FIG. 6 as to connector 69), 81, 82, 83, 84 (FIG. 8 as to connector 74), and 85, 86 and 87 (FIG. 10 as to connector 75). The facing ones of surfaces 78-87 afford snug yet movable registration with oppositely facing flat exterior surfaces of the minor chords and other framing members of frame 50 upon insertion of ends of those framing members between those facing surfaces as frame 50 is assembled (see FIGS. 13-24). Aligned pairs of holes 89 are formed through elements (flanges) 77 at suitable locations in each particular node connector to enable the insertion of zero-clearance shear pins through them and through holes formed through the ends of the relevant framing members, as described above concerning frame 25.

Figure 8:
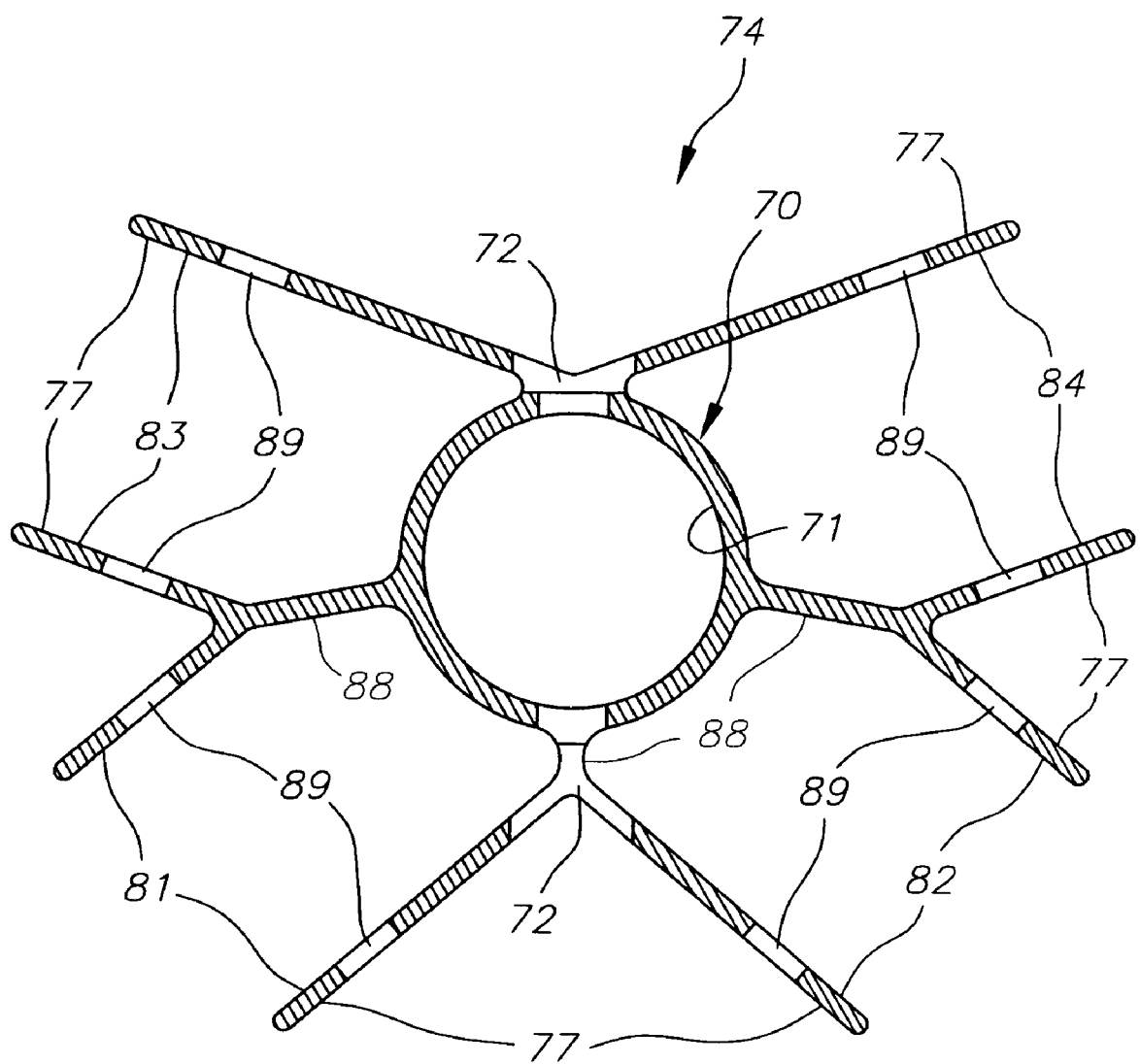
FIG. 8 is an end view of a second node connector configuration useful in the DLG shown in FIG. 5.
Figure 9:
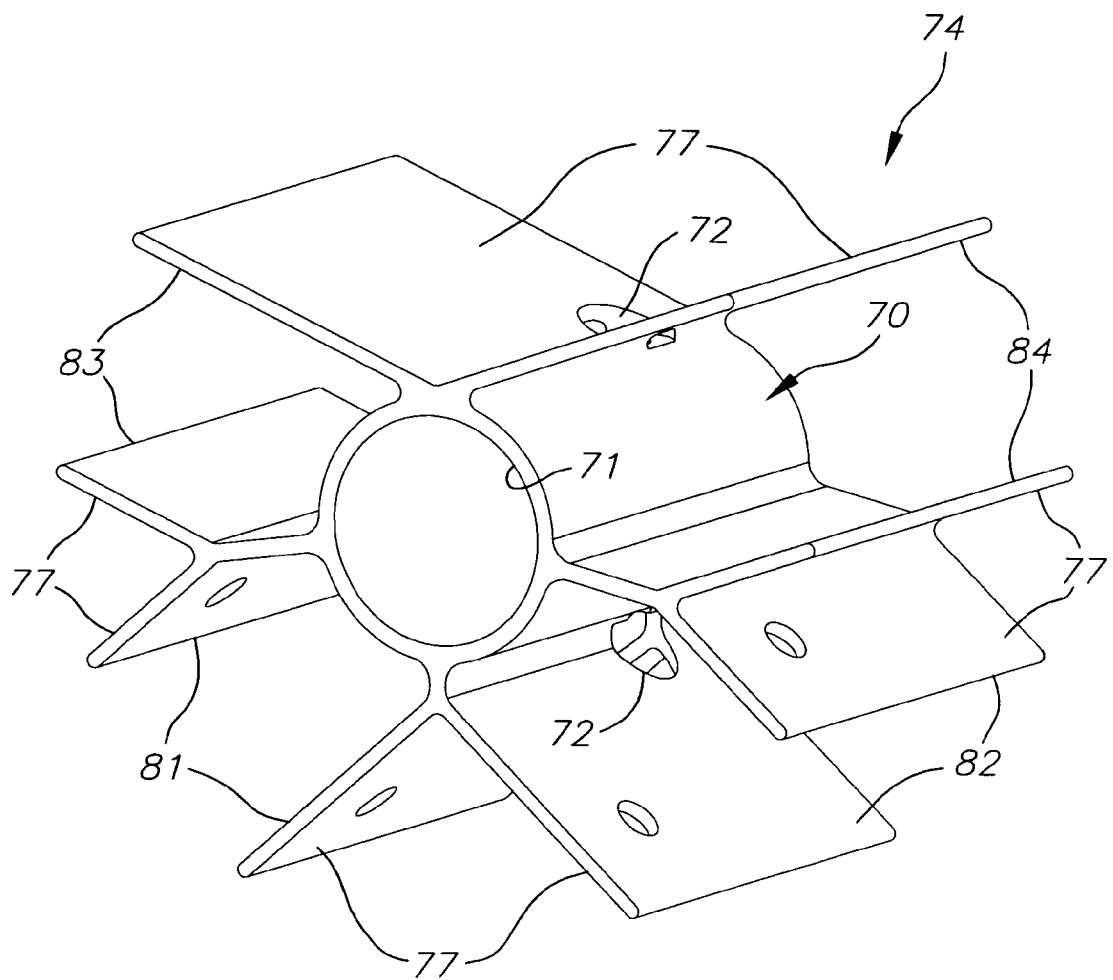
FIG. 9 is a perspective view of the node connector of FIG. 8.

FIGS. 6, 8 and 10 show that certain ones of flanges 77 can be branched at their outer ends in order to define facing surface pairs 78-87 in which, in each pair, the surfaces are parallel to and equidistantly from corresponding central planes which include the axis of that node connector's chord receiving passage 71 and the neutral axis of the round tubular major chord received in that passage.

That is, in the node connector shown in FIG. 6, the connector elements 77 which define adjacent ones of surfaces 78 and 79, and which define adjacent one of surfaces 79 and 80, are not connected directly to the exterior of tube portion 70. Instead they are carried at the ends of ribs which are connected directly to the exterior of tube portion 70. The ribs preferably are disposed in planes which intersect the connector passage axis. This feature of a node connector allows connection to the connector of framing members lying in planes which have relatively small angular separation between them at the node connector while enabling the neutral axes of those framing members to have the desired intersection with the neutral axis of a framing member (chord, e.g.) located in the passage 71 of that node connector. The movement of the shear pin locations outwardly from the tube portion of the node connector is not a disadvantage.

Figure 13:
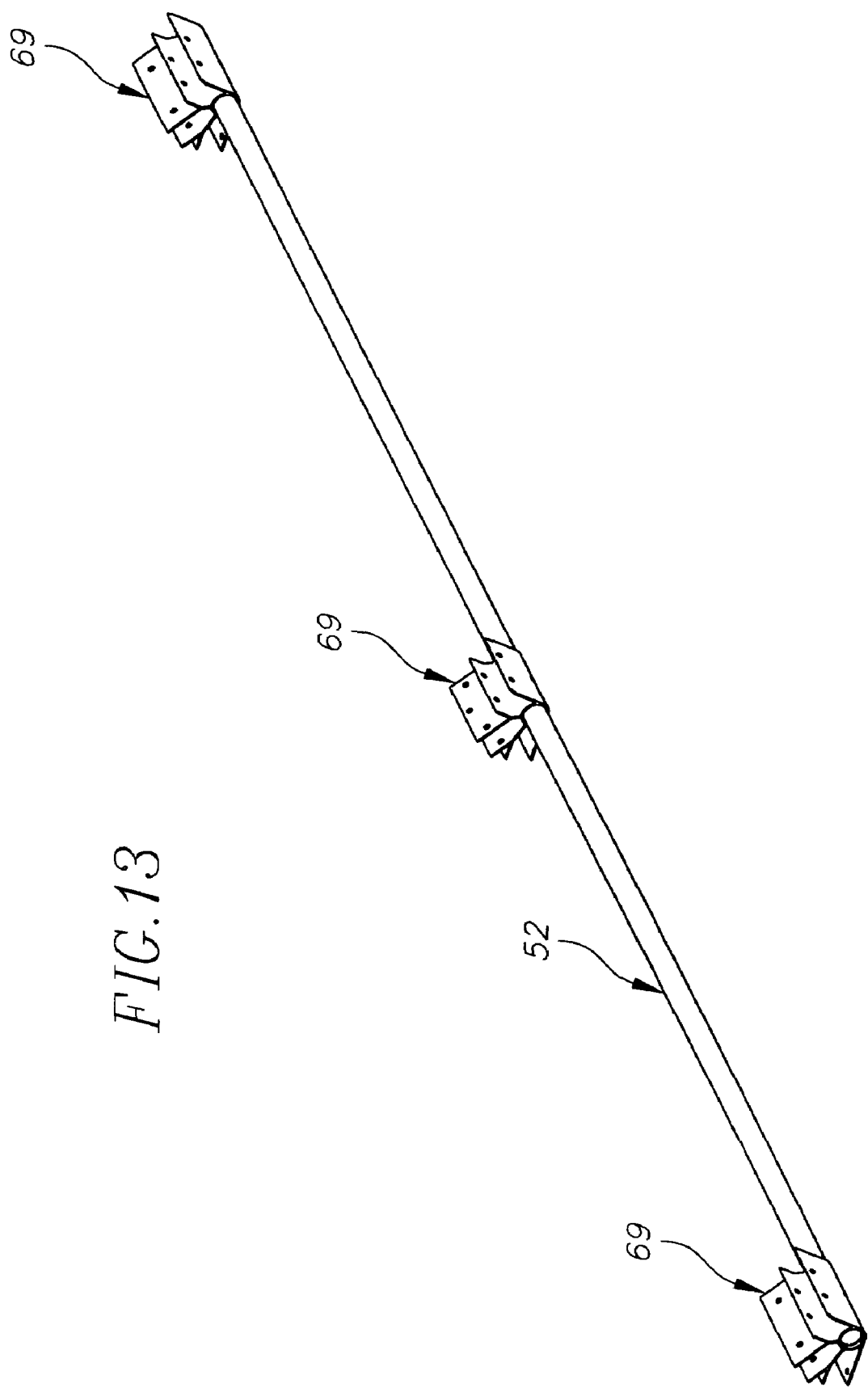
FIG. 13 is a perspective view illustrating a first step in the construction of the DLG of FIG. 5.
Figure 14:
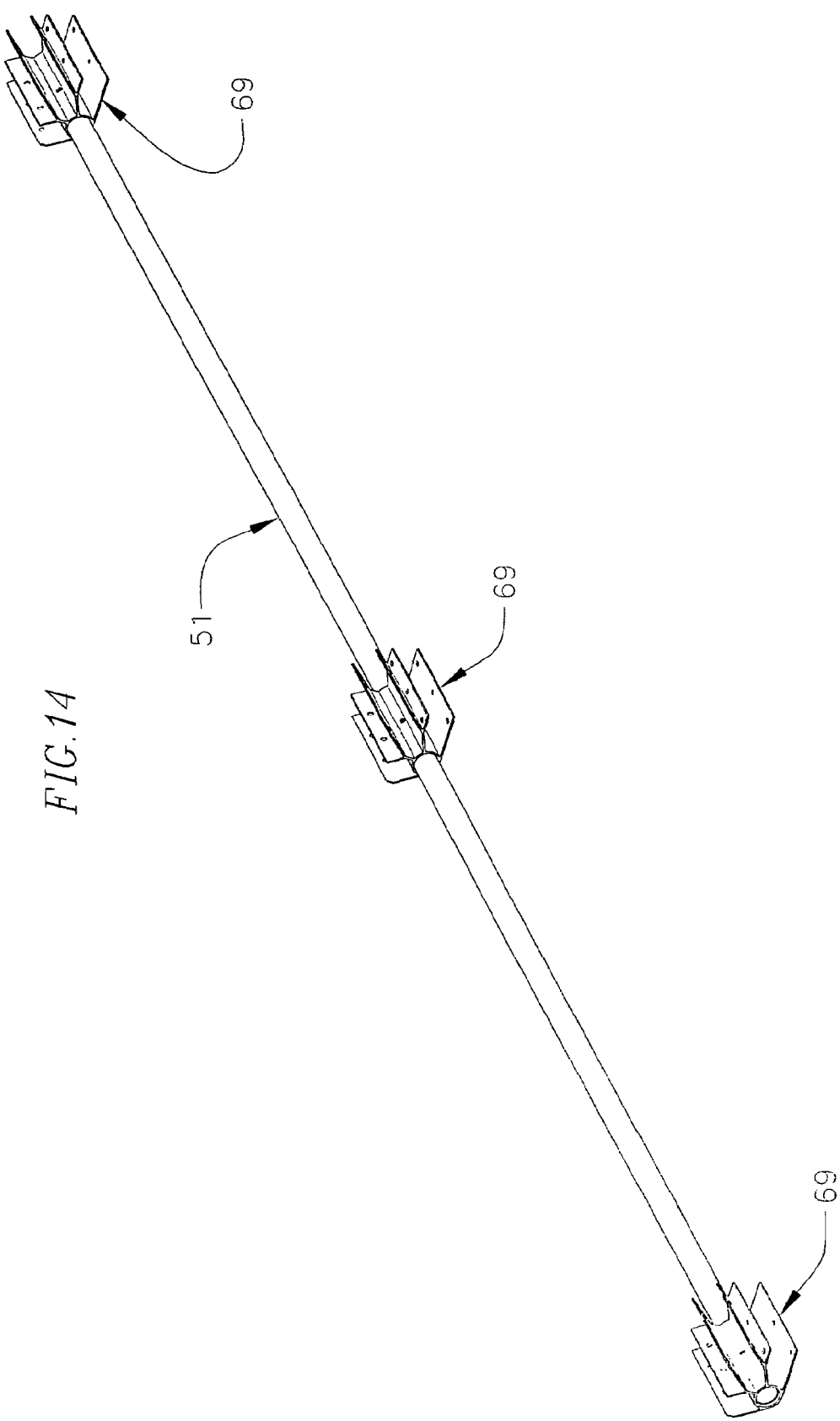
FIG. 14 is a perspective view illustrating a second step in that same construction process.

The structure of completed frame 50 will become apparent from an understanding of FIGS. 13-24 which depict consecutive steps in the assembly of the frame from its component round and square tubular framing members and its node connectors 69, 74 and 75. The first of those steps is shown in FIG. 13. Node connectors 69 are engaged around the preferably tubular round member which defines bottom major chord 52 and are secured to it at the ends and the center of that chord. Each prefabricated node connector of frame 50 can bear coding notations which inform those persons assembling the frame where each node connector is to be placed in the frame and what directionality it is to have relative to the ends of its major chord member. Then, as shown in FIG. 14, three node connectors 69 are similarly engaged around and secured to bottom major chord 51.

Figure 15:
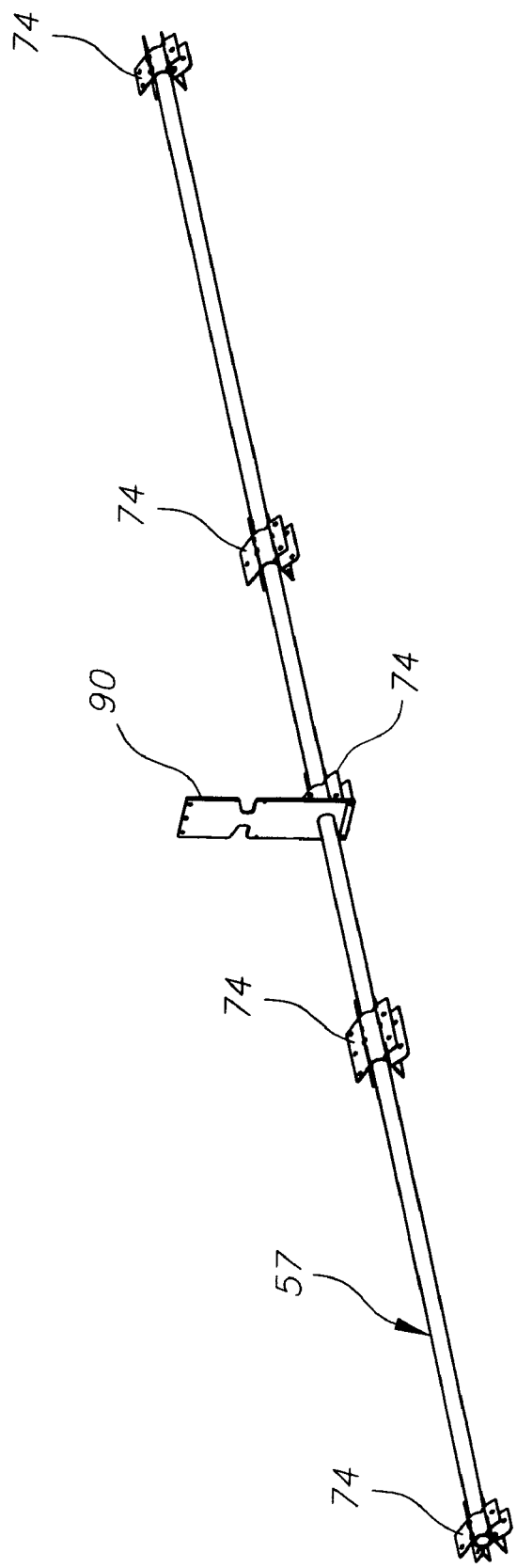
FIG. 15 is a perspective view illustrating a third step in that same construction process.
Figure 16:
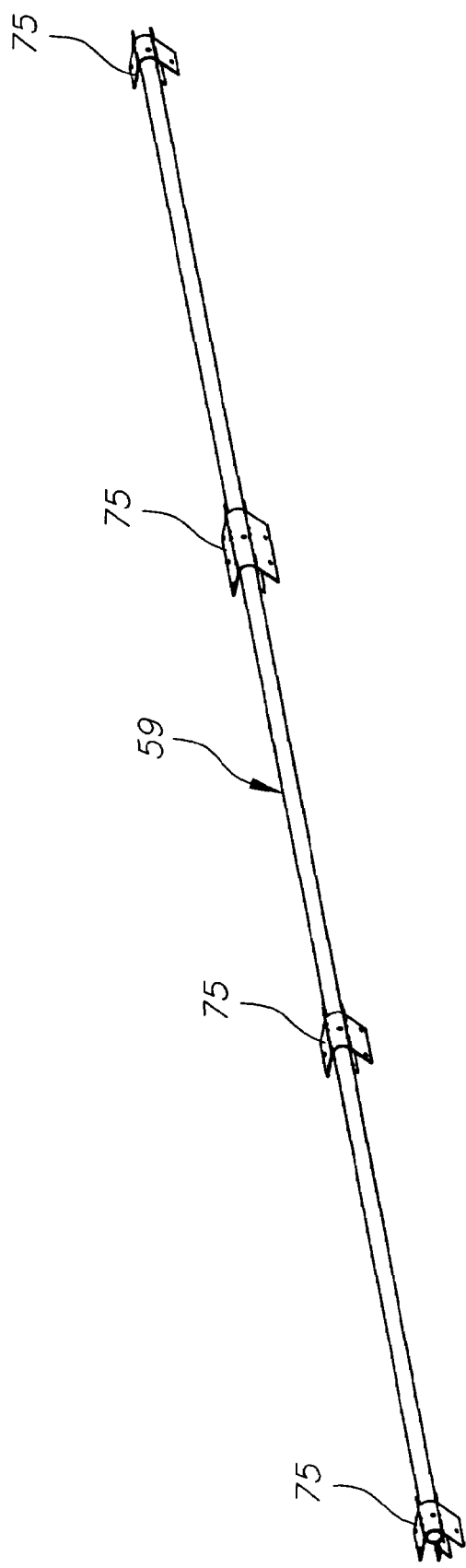
FIG. 16 is a perspective view illustrating a fourth step in that same construction process.
Figure 17:
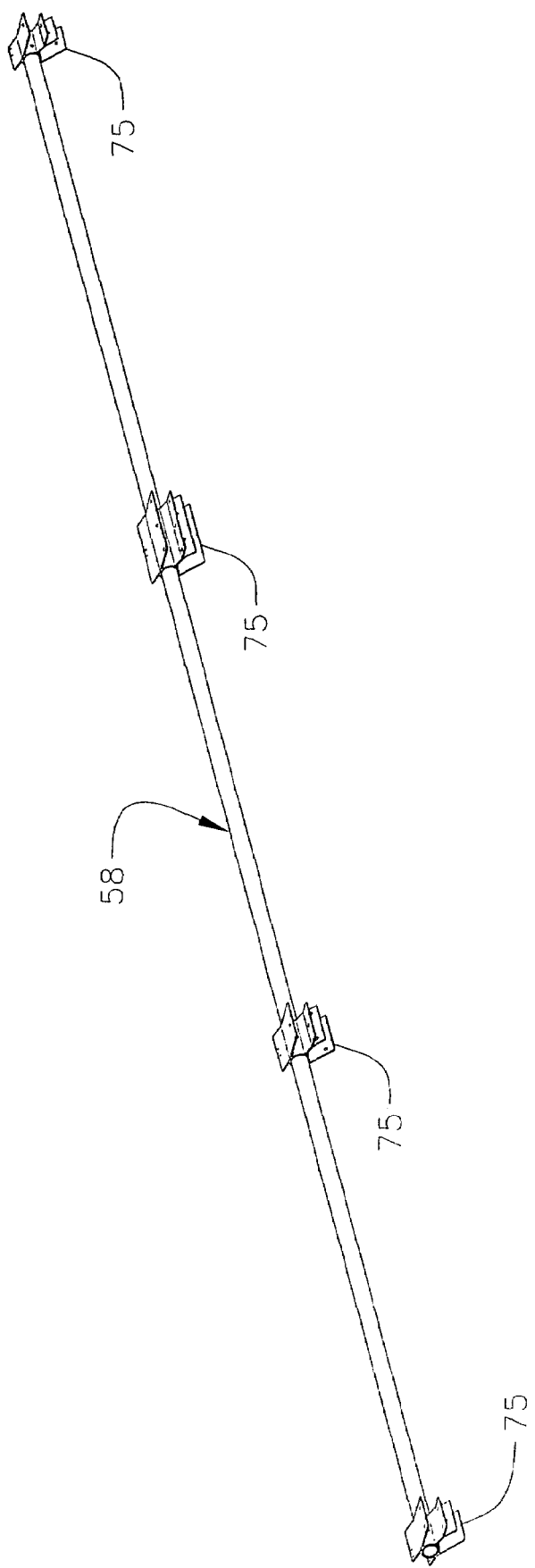
FIG. 17 is a perspective view illustrating a fifth step in that same construction process.

As shown in FIG. 15, a third step in the frame assembly process can be the mounting of five node connectors 74 in the proper sequence on upper center major chord 57 and the pinning of them to the chord. In that process, a plate 90 is mounted to the chord in association with the central node connector, which plate will later have connected to it a support 66. Note that node connectors 74 are not uniformly spaced along chord tube 57; see also FIG. 19 where the reason for that connector spacing is made apparent. Fourth and fifth steps in the frame assembly process can be the placement of node connectors 75 on each of outer central major chord tubes 58 and 59 and the pinning of those connectors to those tubes; see FIGS. 16 and 17.

Figure 18:
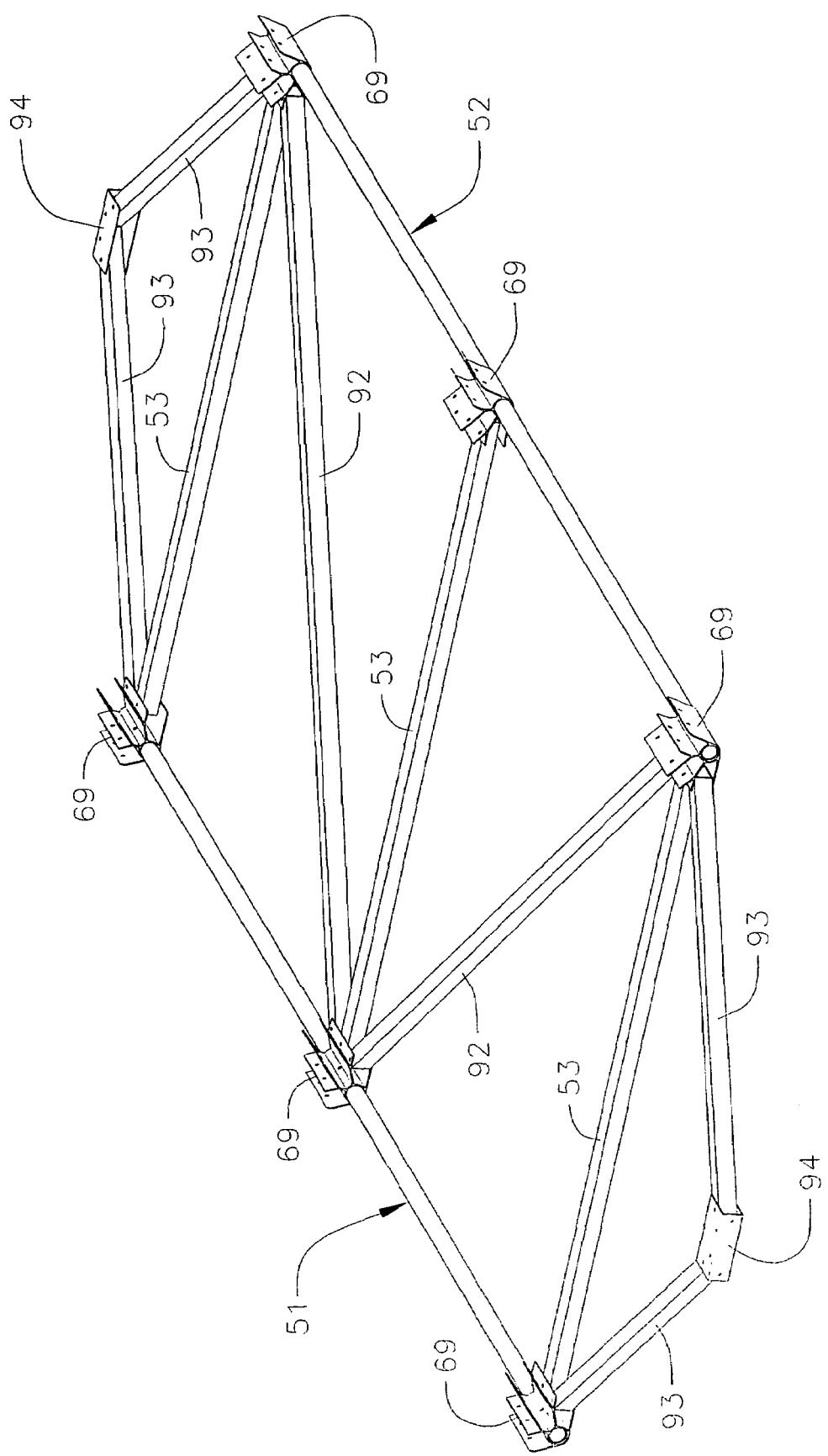
FIG. 18 is a perspective view illustrating a sixth step in that same construction process.

FIG. 18 illustrates a sixth step in the frame assembly process, namely, the interconnection of bottom major chord tubes 51 and 52 by bottom minor chords 53, torsion bracing members 92 and additional elements of the frame, using zero-clearance shear pins to make all connections to node connectors. The major chords 51, 52 and the minor chords 53 define two rectangular bays in the bottom layer (surface) of frame 50. Those major chords are shorter in length than upper major chords 57-59. Compensation for that major chord length difference is achieved by connecting to each end of each bottom major chord tube an additional preferably square framing member 93. At each end of the bottom layer assembly, the other ends of transversely adjacent members 93 are doubly pin-connected or bolted (a stiff connection) to a coupling fitting 94 to which an end of a frame torque arm 65 later will be secured.

Figure 19:
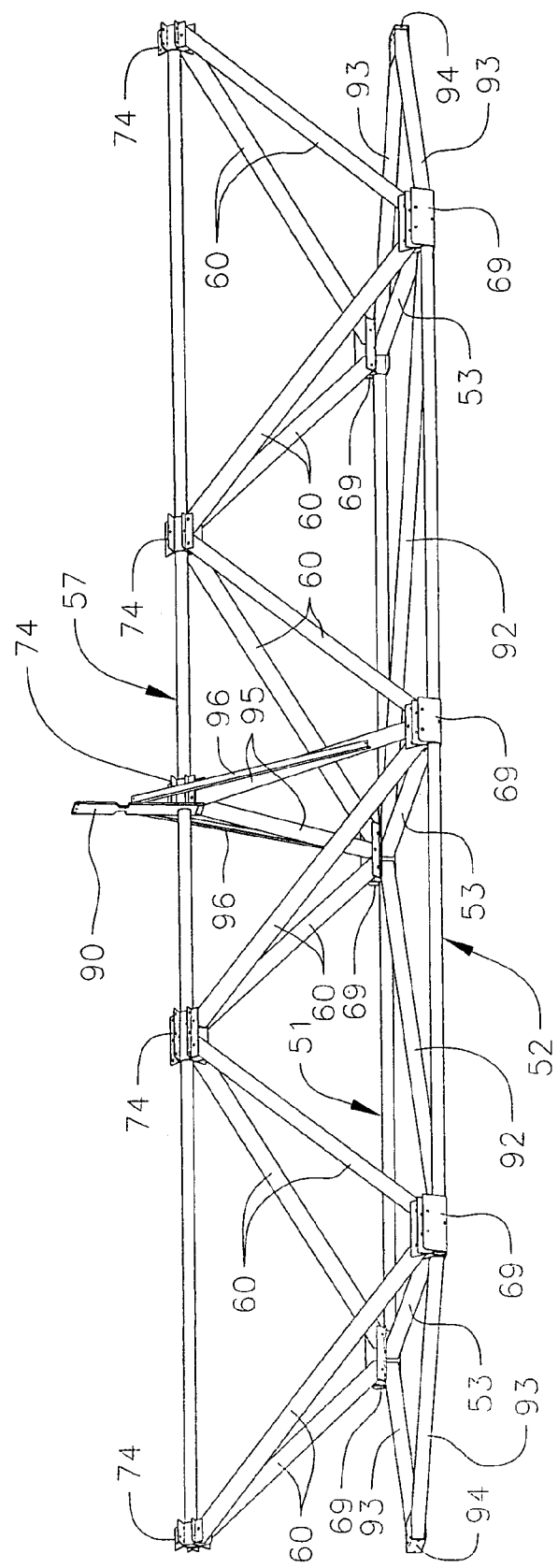
FIG. 19 is a perspective view illustrating a seventh step in that same construction process.
Figure 20:
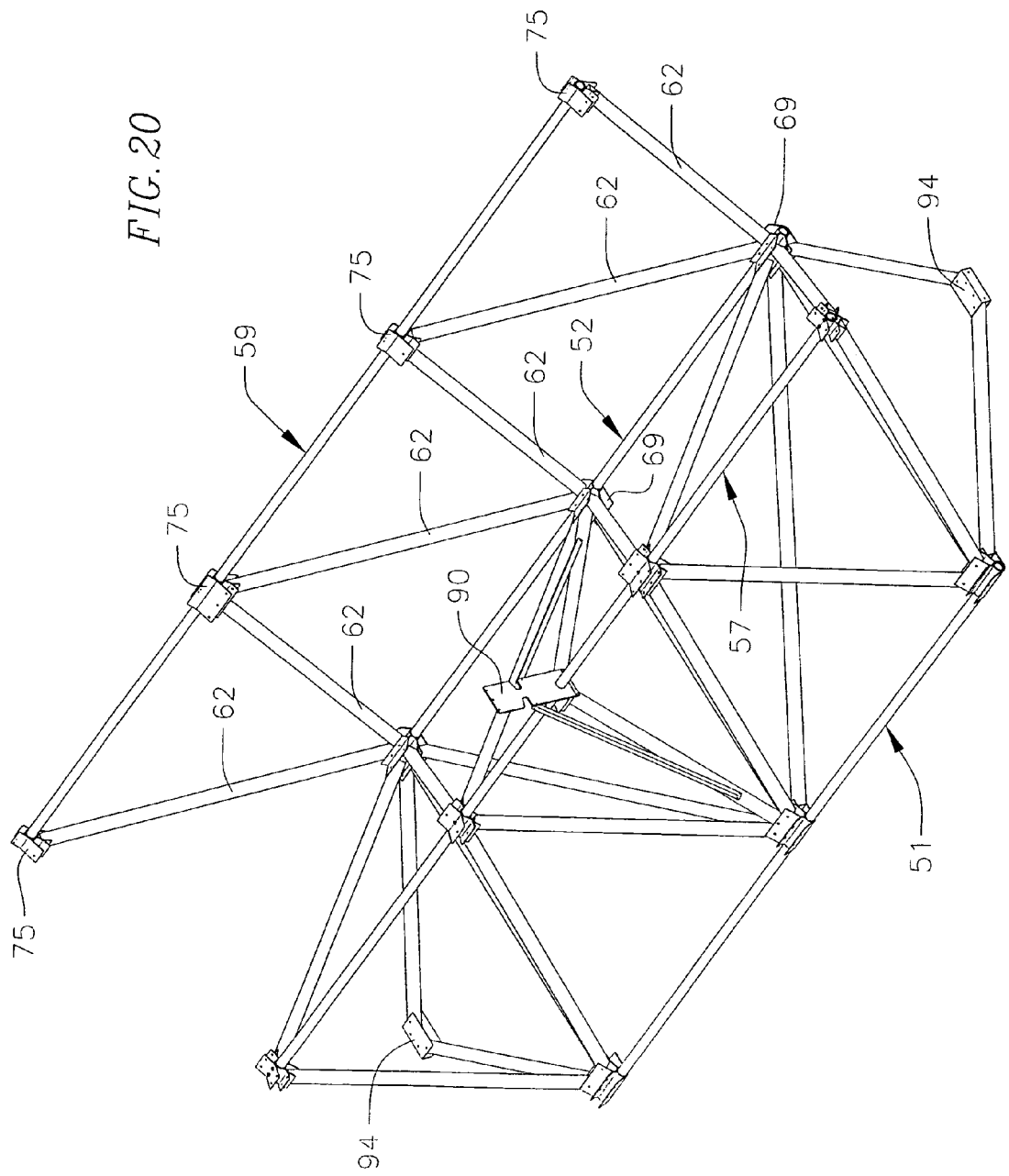
FIG. 20 is a perspective view illustrating an eighth step in that same construction process.

The upper central major chord subassembly (FIG. 15) can be connected in place relative to the bottom major chord assembly (FIG. 18) as depicted in FIG. 19 as a seventh step in the assembly process. Central struts 60 are pinned between the node connectors 69 on the bottom major chords and the end node connectors 74 on the central chord, and the two other connectors 74 which are on opposite sides of the center of upper center chord 57. Two further framing members 95 are pinned between center node connector 74 on upper chord 57 and the respective center node connectors 69 on bottom chords 51, 52. Plate 90 can then be secured, as by bolting or riveting, to the ends of members 95 which are pinned to center node connector 74. Plate 90 can be further fixed in its desired position by connecting braces 96 between the central part of the plate and framing members 95 as shown in FIG. 19. The completion of this assembly step causes torque arm connection fittings 94 to be located substantially below the opposite ends of upper central major chord 57.

Eighth and ninth steps in the assembly of frame 50 can be the pinned connection of upper outer major chords 59, 58 to bottom major chords 52, 51, respectively, via longer struts 62 and node connectors 69 and 75. See FIGS. 20 and 21.

Figure 22:
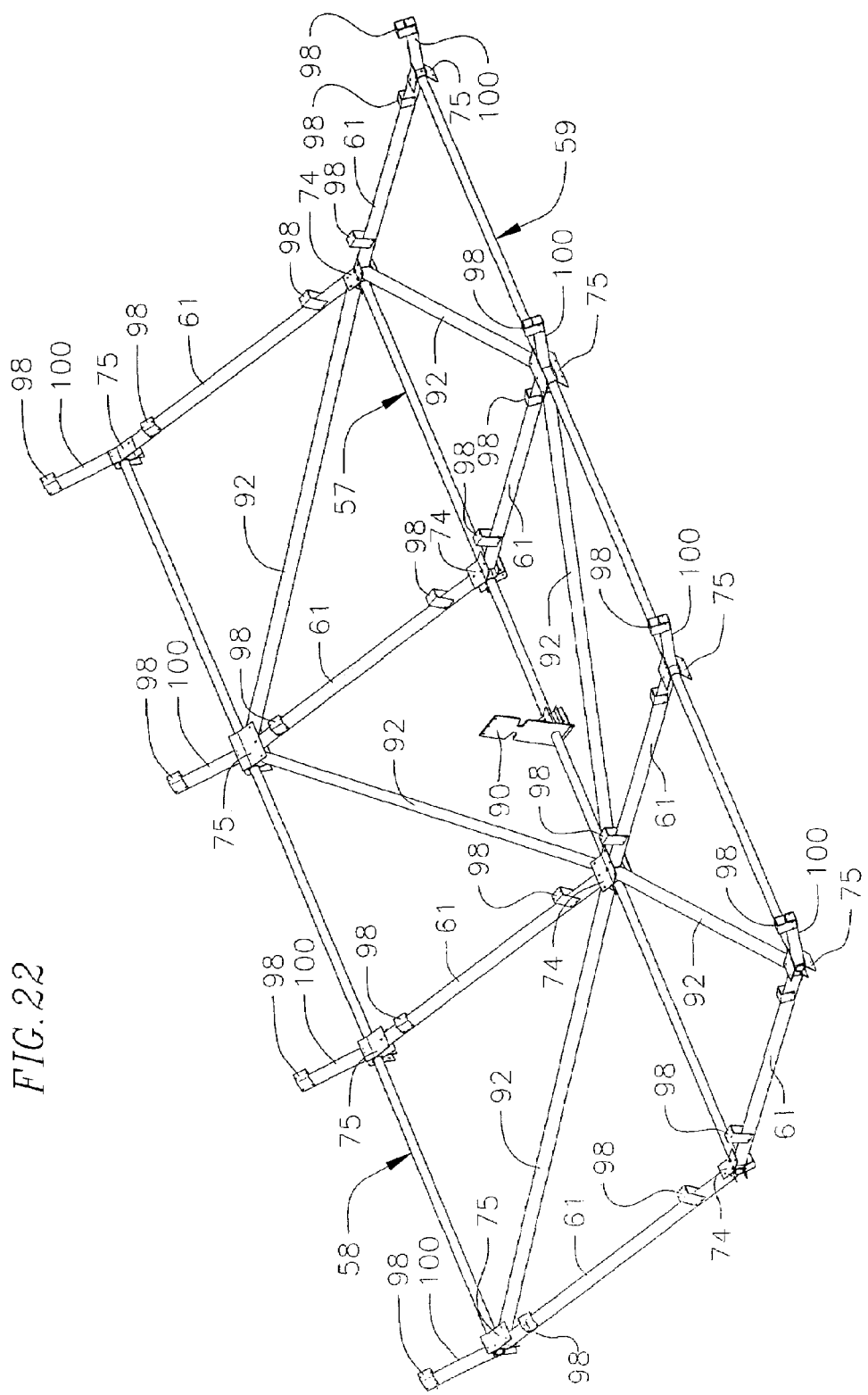
FIG. 22 is a perspective view illustrating a tenth step in that same construction process, substantial parts of the previously assembled space frame being deleted from FIG. 22 for enhanced clarity of depiction of structure being added by step ten.

A tenth step in assembly of frame 50 can be the interconnection of the upper outer major chords 58, 59 to upper central major chord 57, and the connection of auxiliary framing members to chords 58 and 59. Such a step is depicted in FIG. 22 which shows upper minor chord framing members 61 pinned between center chord node connectors 74 and laterally adjacent outer chord node connectors 75; in the interest of clarity of illustration, frame elements located below the top of the frame are not shown in FIG. 22. Torsion braces 92 are disposed (one in each of the six bays defined by members 57, 58, 59 and 61) diagonally between the chord members so that, on each side of center chord 57, the torsion braces alternate in the ways which they are skewed relative to the length of the frame. As connected between major chords 57, 58 and 59, upper minor chords 61 can carry inverted U-clips 98 at selected locations along their lengths for later connection to them of longitudinal mirror mounting tubes 99 (see FIGS. 23 and 24). Clips 98 function as risers from the flat upper surfaces of frame 50 to conform to the curvature of the focusing reflector which the frame supports in use. Also, square extension tubes 100 (akin to frame outriggers) can be rigidly connected between surfaces 87 of each of node connectors 75.

Each tube 100 can carry an inverted U-clip at its unsupported end. Thus, at each transverse station of frame 50 corresponding to the locations of upper minor chords 61, the frame can include six clips 98 as features which facilitate the connection of mirror 64 to the frame.

Figure 21:
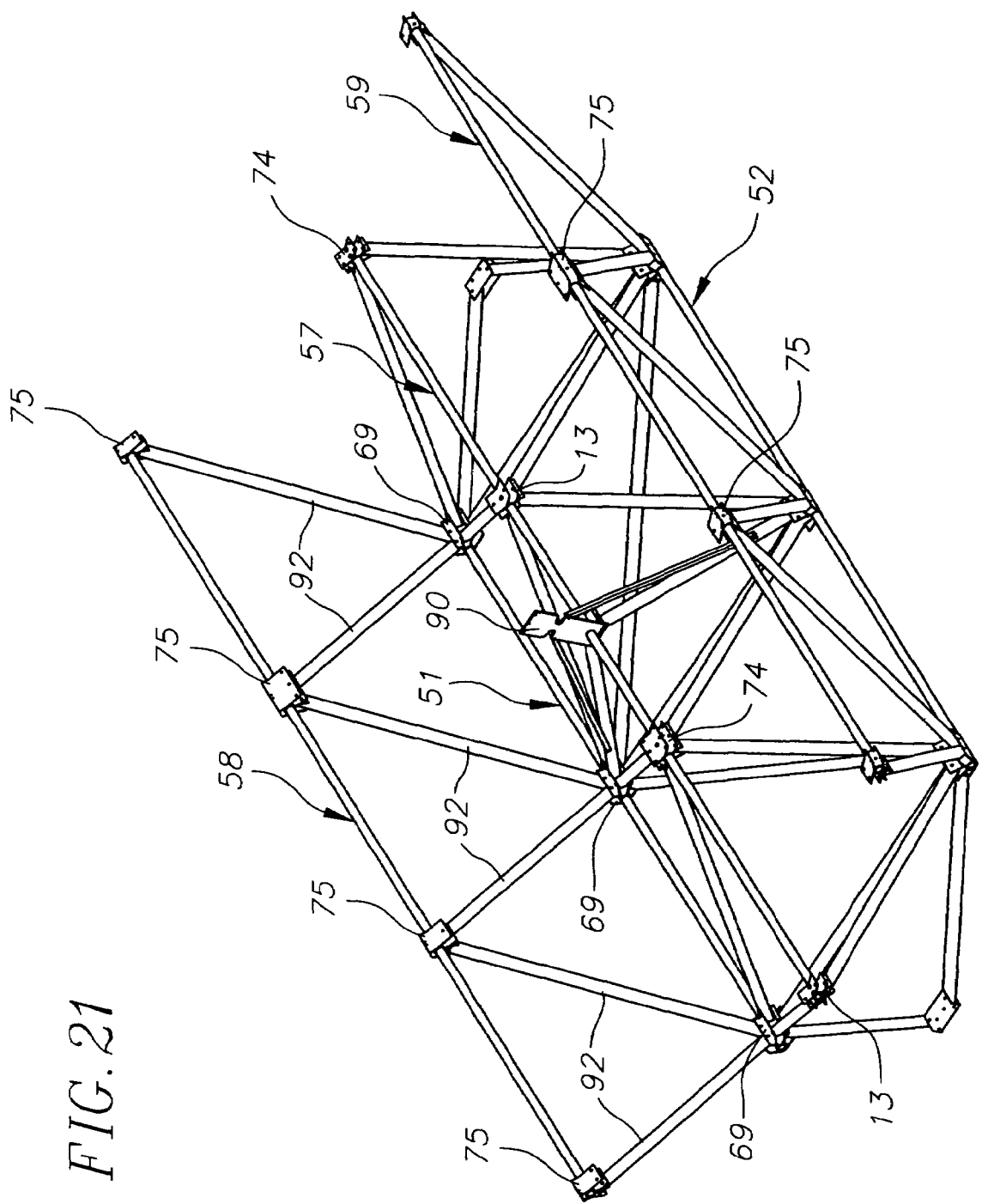
FIG. 21 is a perspective view illustrating a ninth step in that same construction process.
Figure 23:
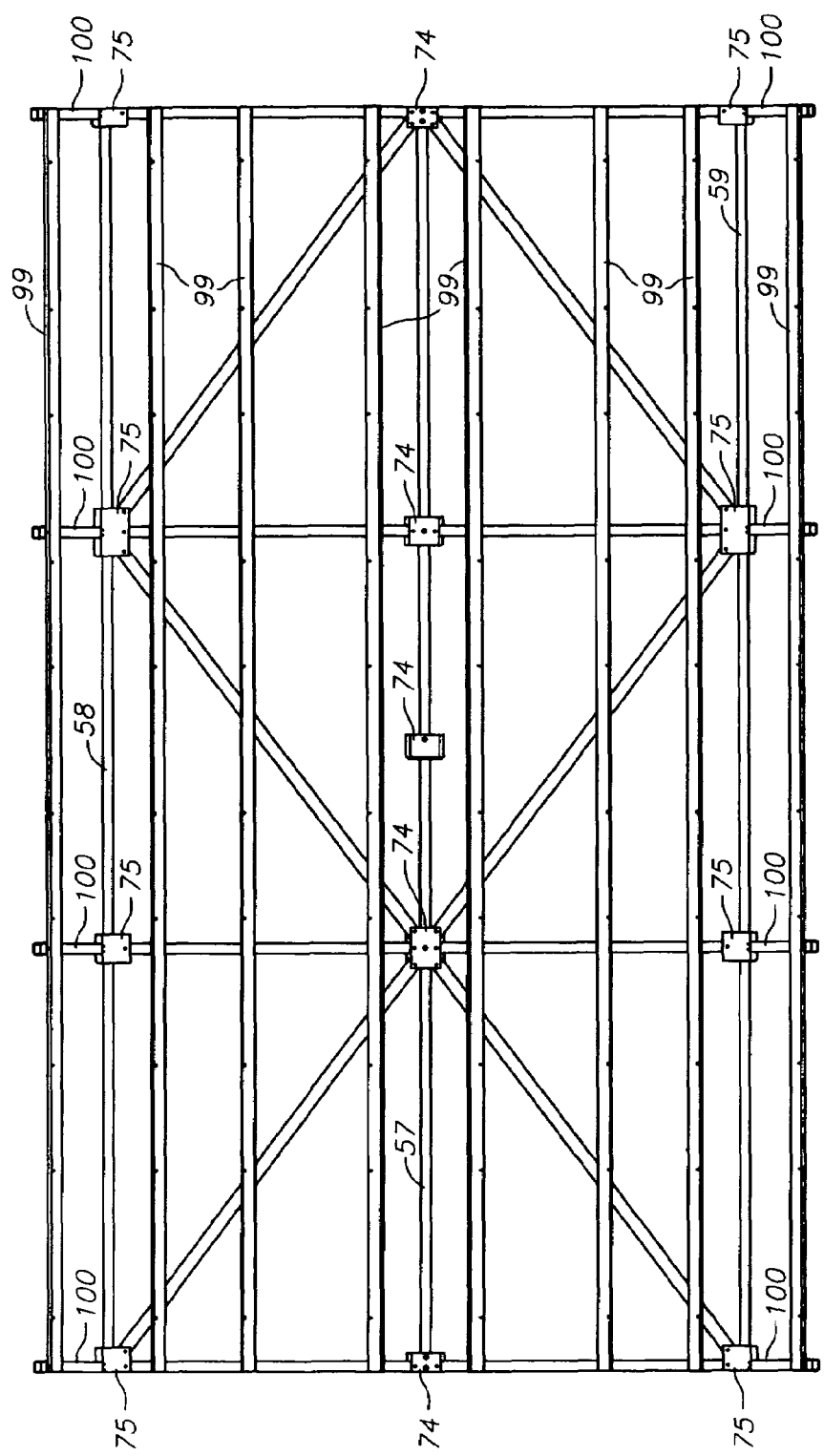
FIG. 23 is a top plan view which illustrates an eleventh step in that same construction process.

Attention is directed to node connector 74 on upper center major chord 57 between plate 90 and the left end of the frame as depicted in FIGS. 21, 22 and 23. In addition to major chord 57 which extends continuously (preferably) through that node connector, there are ten further framing members which have an end pinned to that node connector, namely, four central struts 60 having end surfaces registered with node connector surfaces 81 and 82, two torsion braces 92 and one upper minor chord 61 having end surfaces registered with connector surfaces 83, and two torsion braces and one upper minor chord 61 having end surfaces registered with connector surfaces 84. That plurality of framing member connections to that node connector illustrates one form of the versatility of node connectors according to this invention.

The presence of mirror support outriggers 100 in frame 50 illustrates another form of the versatility of this invention's node connectors, namely, the ability of the node connectors to function as connectors for elements which are auxiliary to but not part of the relevant space frame as such.

Figure 24:
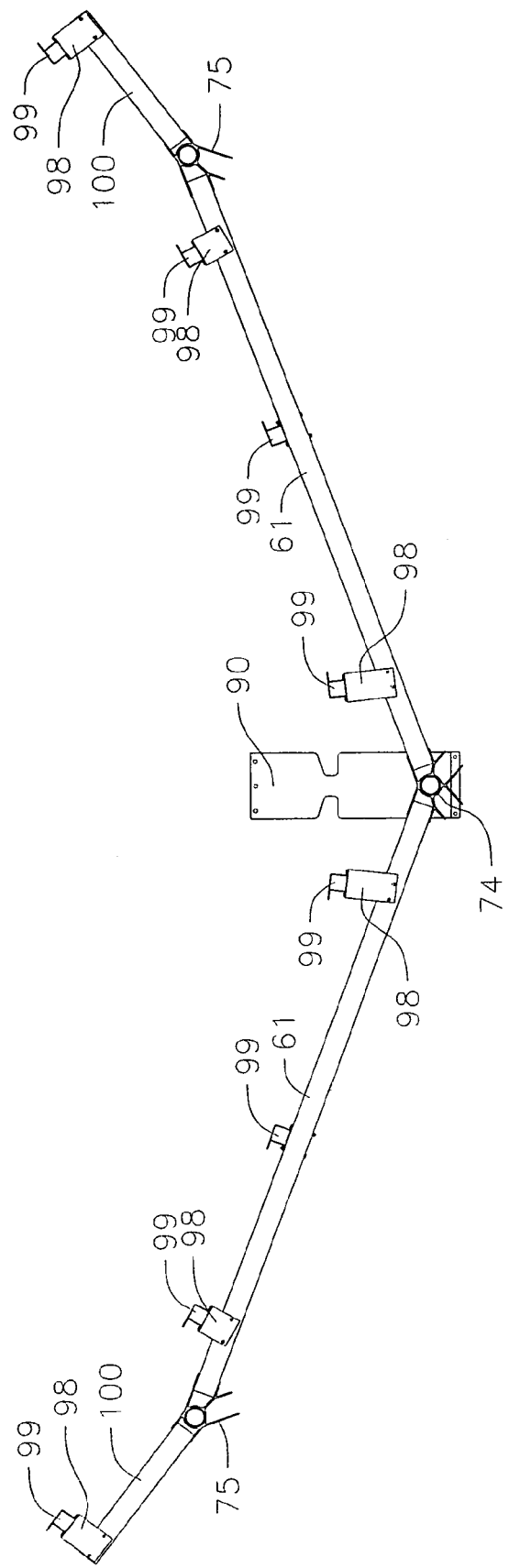
FIG. 24 is a fragmentary end elevation view of a portion of the structure shown in FIG. 23.

FIGS. 23 and 24 show a plurality of mirror support tubes 99, disposed on parallel lines along the length of the frame, connected either directly to frame 50 or to inverted U-clips 98 which are connected to the frame. The mirror support tubes 99 preferably are aluminum extrusions with a cross-sectional configuration which includes a rectangle or a square with upper and lower external flanges. The mirror support tubes conform to a curved line which is, in essence, the curvature of the reverse side of concave mirror 64.

FIG. 23 is a top plan view of frame 50 with mirror support tubes mounted to it. FIG. 23 is a good illustration of the benefits of using extruded or pultruded elements of constant cross-section and indefinite length as sources for node connectors of specified cross-section but of different lengths. For example, in FIG. 23 there are four node connectors 75 carried on each of major chords 58 and 59; on each of those chords, the node connectors are of three different lengths determined, principally, by the number of other framing members which are connected to them.

Figure 25:
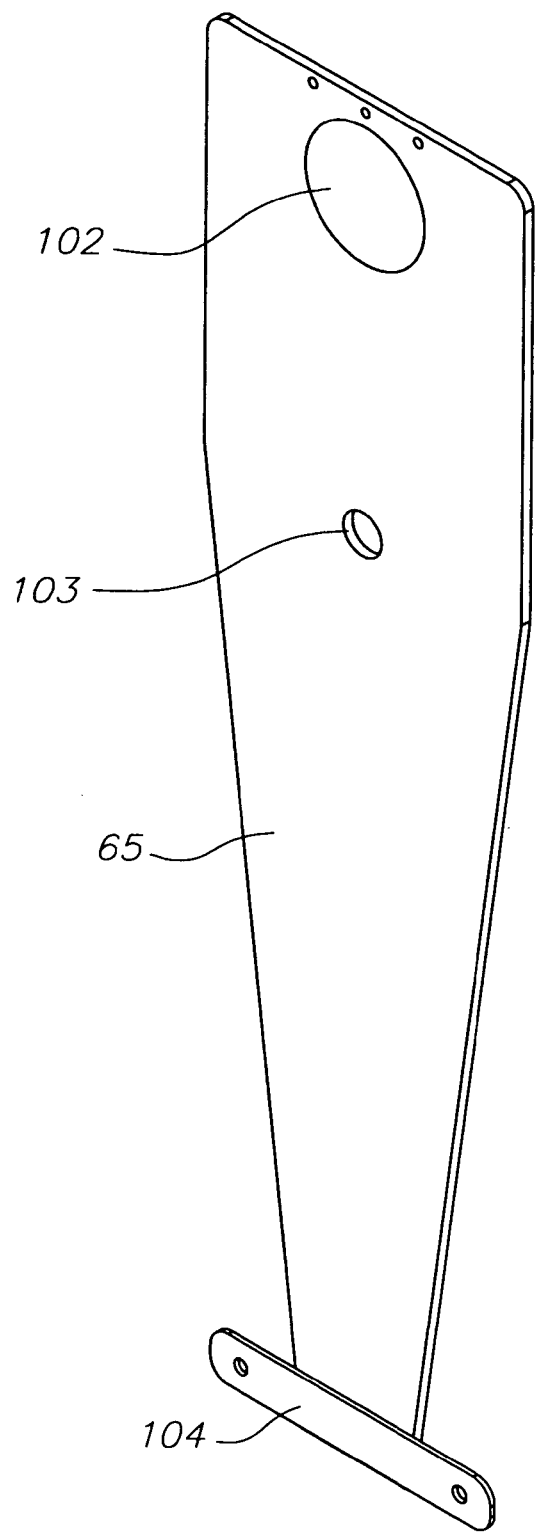
FIG. 25 is a perspective view of one of the two pivot (torque transfer) arms which are components of the mirror support armature of FIG. 5.

A torque arm 65 for mirror support frame 50 is shown in FIG. 25. Closely adjacent to its upper end, a large aperture 102 is formed through the plate for cooperation with a frame drive shaft (not shown) which can pass through that aperture to a suitable mechanism for controllably rotating the shaft. The plate provides a mechanism for connecting a frame 50 to such a drive shaft for movement of the frame with the shaft. Plate 65 also includes a smaller hole 103 through it below aperture 102, but near the upper end of the plate, for receipt of an end of frame upper central major chord 57. A cross piece 104 can be connected to the lower end of the plate and to define a pair of holes via which the plate can be bolted, e.g., to a coupling fitting 94 of frame 50.

As noted above, all framing members (major chords, minor chords, struts, torsion braces, and other components) and node connectors of frame 50 preferably are made of the same type of aluminum. Thus, all of those frame components are affected equally by temperature changes. Also, all pinned connections in frame 50 preferably are defined by use of the zero-clearance shear pin technique described above. Precision fabrication of the components of frame 50 for field assembly, including cutting extrusions to desired lengths and the drilling (or other hole formation operations) of holes in those extrusion lengths at precise locations can be facilitated by the use of precision jigs and fixtures and the use of appropriate shop practices. As a result, frame 50 can be constructed to very small tolerances which produce a very rigid, comparatively lightweight, and temperature-insensitive support for mirror 64 which manifests essentially no deflection as the frame is turned about its mounting axis and experiences changes in the way gravity acts on the frame.

Worked skilled in the art will appreciate that the cross-sectional configurations of node connectors having chord-retaining tubular portions, such as portions 70 of node connectors 69, 74, and 75, can be varied to define passages conforming to the cross-sectional shapes of non-round tubular members or of non-tubular members having standard shapes (e.g., channels) or custom shapes. Those workers also will appreciate that transverse chords, struts, and torsion braces can be square or other even-sided polygons, ovals with flats, or rolled shapes having flat and parallel exterior surfaces.

The zero-clearance shear pins described above (see FIG. 11) can be installed, to make desired connections, either by driving them axially into place through the relevant holes in node connectors and framing members, or by turning them into place. If the pertinent framing member has its pin receiving holes formed in relatively thick-walled portions of the member, then the zero-clearance shear pin can be installed by axially driving it, as by lightly hammering on the head of the pin; the pin shank preferably is lubricated before its installation is started. However, if the framing member is a thin walled tube, e.g., driving a zero-clearance shear pin into place through those holes may produce dimpling (or other undesired permanent distortion) of the framing member in the vicinity of those holes. In that situation, the preferred procedure for installing a lubricated zero-clearance shear pin in to turn it into position, as by use of a wrench engaged with a non-round shear pin head, while applying axial force to the pin. In the latter situation, the threadless shank of the shear pin "self-threads" its way into and through the framing member holes without causing dimpling or other distortion of the framing member in ways which can reduce the force transmitting ability of the member as connected to its node connector.

Figure 26:
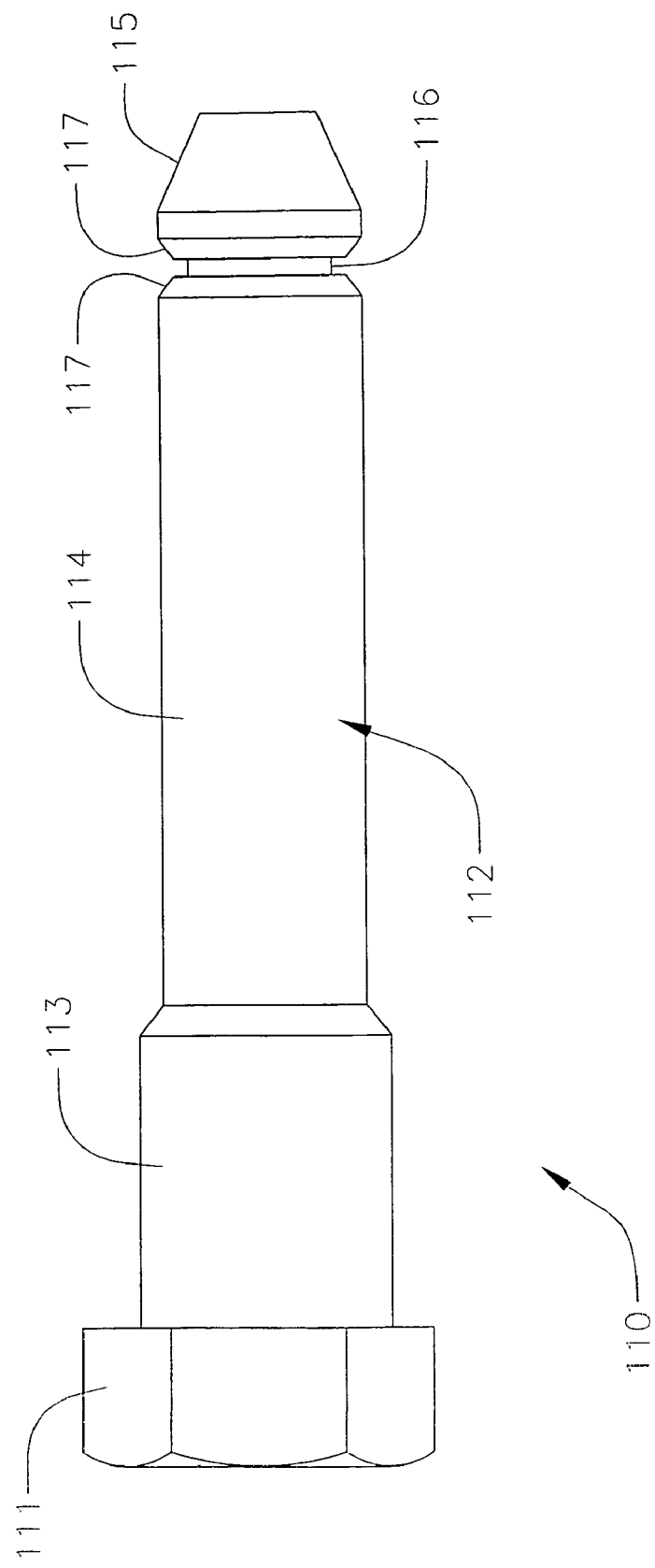
FIG. 26 is an elevation view of another shear pin useful in the practice of aspects of this invention.

A space frame, once assembled, rarely has any of its connections disassembled and removed. This invention affords the ability to disassemble and to reassemble a space frame having interconnections using zero-clearance shear pins. An example of such a disassemblable space frame is scaffolding, and in such space frames (as well as others) the configuration of zero-clearance shear pin 110 shown in FIG. 26 can be used to advantage. Pin 110 has a non-round head 111 at one end of an unthreaded round shank 112, so that the pin can be driven or turned to install it in or to remove it from a pinned connection. Rather than being of constant diameter along its length (save for the presence of a circumferential clip retainer groove) as in pin 40 shown in FIG. 11, the shank 112 of pin 110 is of non-constant diameter. Shank 112 has a relatively short portion 113 of relatively large diameter adjacent to its head 111, and a relatively longer relatively small diameter portion 114 along the balance of its length to a tapered distal end 115 of the pin. A circumferential clip retainer groove 116 is formed in shank position 114 near the distal end of the shank. Preferably, the intersections of the groove walls with the shank's cylindrical surface are chamfered, as at 117, to make easier the insertion and removal of pin 110 into and from thin-wall framing members. It will be apparent that use of pin 110 requires that the pin receiving holes in the end of a framing member be of different diameters, one having a diameter equal to the larger diameter of the pin and the other having a smaller diameter equal to the smaller diameter of the pin. The difference between the larger and smaller diameter of pin shank 112 preferably is slight (e.g., on the order of 0.015 inch) so that the shear resisting capacity of the pin is not meaningfully reduced in its smaller diameter portion, and so that the bearing area of the pin for a framing member connected by it is not meaningfully reduced. An advantage of pin 110 is that its small diameter shank portion does not encounter a receiving hole of that diameter, in the course of being installed, until about the same time as the large diameter portion of the shank encounters a receiving hole of that larger diameter. Installation of the pin to make a pinned connection is easier and faster. Also, in removing the pin from a zero-clearance pinned connection, both pin shank portions become free from their receiving holes at substantially the same time, making pin removal easier and faster. A further benefit is the pin shank and the pin receiving holes in framing members are subjected to significantly reduced episodes of wear of the pin and holes which can cause their effective sizes to change as pinned connections are repeatedly made and disassembled over time. Thus, the benefits of zero-clearance pinned connections can be achieved over longer times in scaffolding and ethef in space frames which are subject to disassembly and reassembly.

Overall weight of a DLG-type space frame often is a significant design problem, especially where the frame is to be subject in use to significant loads, static or dynamic. The use of thin wall framing members suggests itself as a solution to the weight problem. However, where framing members can be subject to meaningful axial loads and pinned connections are to establish framing member interconnections, the use of thin wall framing members can be problematic and troublesome. The reason is that thin wall tubular framing members, because of the thinness of their walls, afford only small areas of the member cross-sections for bearing against shear pins, and for transfer of axial loads in the framing member to a node connector via the shear pins. Those small bearing areas mean that axial forces in the framing member are concentrated in those small areas as they transfer from the member to the shear pin, and that stresses in the members are highest in those areas. Those stresses can reach sufficiently high levels that the framing member crumples, tears or otherwise very adversely deforms at its pin receiving holes, thereby enlarging the effective diameter of those holes. Enlargement of the diameter of a shear pin receiving hole in a framing member of the space frame has the effect of changing the working length of the member, and that means that the member no longer can carry or transmit the loads applied to it in the space frame. That, in turn, causes other framing members in the space frame to be subjected to increased loads, which can cause their pin receiving holes to enlarge as those other framing members tear or crumple at those holes. The result can be a catastrophic failure of the space frame. FIG. 27 and 28 depict a solution to the problem of the use of thin wall tubes as framing members in reduced weight space frames.

FIG. 27 is a transverse cross-sectional elevation view of a non-round (oval) thin wall structural tube 120, preferably an extrusion. Over most of its circumference, tube 120 has a relatively small wall thickness $t_1$. Tube 120 has orthogonally related (perpendicularly oriented) axes of symmetry X-X and Y-Y (or X and Y axes). The tube dimension along the Y axis is less than its dimension along the X axis. The tube cross-sectional shape is arranged so that the tube has opposite walled flat exterior surface portions 121 which are centered on and extend across the member's Y axis and are parallel to axis X, and in the width of each of those surface portions 121 the wall thickness of the framing members is increased (preferably inwardly) to thickness $t_2$. That is, the spacing of the inner surface of the tube from its outer surface increases from $t_1$ to $t_2$ across the width of each surface portion 121. As a result, tube 120 has increased bearing areas against a shear pin passing through pin receiving holes 122 formed through the tube in alignment with the Y axis. The increased bearing areas means that the tube can carry and transmit to the shear pin axial loads in the tube of magnitude greater than would cause a tube having uniform wall thickness $t_1$ to crumple or tear at holes 122.

In tube 120, zones 121 of increased wall thickness extend along the entire length of the tube. It will be apparent that if the tube were defined with uniform wall thickness around its circumference, the section modulus of the tube (and its resistance to bending) about the tube's Y axis would be greater than the section modulus of the tube (and its resistance to bending) about the tube's X axis. It is also apparent that, because the wall thickness of tube 120 is increased in the portions of the tube's circumference where the exterior surfaces of the tube are flat and parallel to the tube's X axis, tube 120 has a section modulus about the X axis which is greater than the X axis section modulus of a tube of the same exterior contour and dimension having uniform wall thickness $t_1$ about its circumference, and so tube 120 is more resistant to bending about the X axis than such comparable tube of uniform wall thickness $t_1$. Thus, it will be apparent that by adjustment of the widths of tube zones 121 and the difference between tube wall thickness $t_1$ and $t_2$, tube 120 can be defined to have a section modulus about the X axis which is equal to the tube's section modulus about the Y axis, so that the tube's structural performance abilities in bending are essentially the same as those of a round tube having a diameter equal to the X axis dimension of tube 120 and having uniform wall thickness $t_1$. The thin wall tube 120 has enhanced ability to carry and transmit axial loads (tension or compression) because of its increased wall thickness at holes 122. Tube 120 also has enhanced column properties (notably resistance to buckling when subjected to compressive loads) because of its enhanced section modulus about its X axis. These benefits are obtained with minimal increase in the weight of the tube over one of uniform wall thickness $t_1$ because the adjustments to wall thickness are made in small sections of the tube circumference where they are most effective. The presence of oppositely facing aligned, flat areas in the exterior of tube 120 adapts tube 120 to effective use in node connectors of this invention because those flat tube surfaces can register closely with facing flat surfaces of a node connector where the tube can be pinned to the node connector. The ability to use thin wall tubes, modified according to the principles illustrated in FIG. 27, in a space frame having pinned connections means that the weights of framing members (major chords, minor chords, struts, torsion braces, and the like) in such frames can be reduced without reducing the load carrying capacity of the frame. Reductions in the weight of space frame components produce reductions in the costs of the frame components.

FIG. 28 is a transverse cross-section view of another non-round (rectangular) thin wall structural tube 125 which has its wall thickness increased to $t_2$ from $t_1$ in central zones 126 of its greater dimension (width along the tube's X axis, as compared to its height along the Y axis.) The increased wall thickness preferably is manifested in the inner surfaces of tube 125. Shear pin receiving holes 127 are formed through the tube walls in its zones of increased wall thickness, preferably centered on the Y axis, adjacent each end of the tube so that the tube can be pinned to a node connector according to this invention in a space frame of reduced weight. Tube 125, like tube 120, can be used to define a major chord, a minor chord, a strut, or other component of the frame. Tube 125 can be defined to have equal section moduli about its X and Y axes, if desired, or unequal adjusted section moduli if that should be desired.

Figure 30:
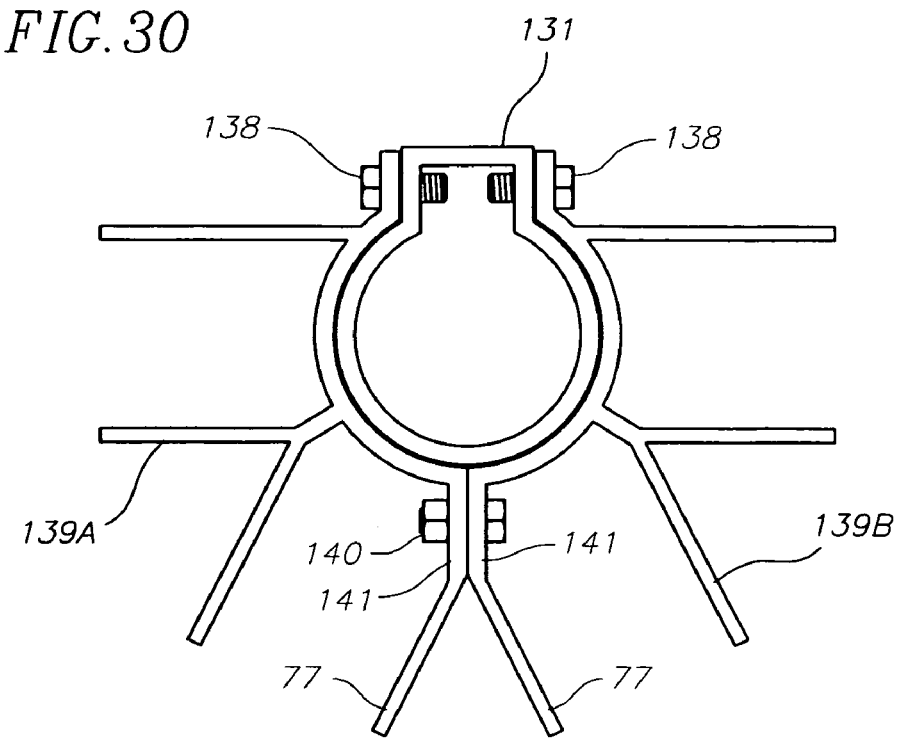
FIG. 30 is a cross-section view of a further node connector which is a variant of the node connector shown in FIG. 29, the variation being that the node connector is defined by two identical parts, which preferably are extrusions, secured to each other and to a frame chord.
Figure 31:
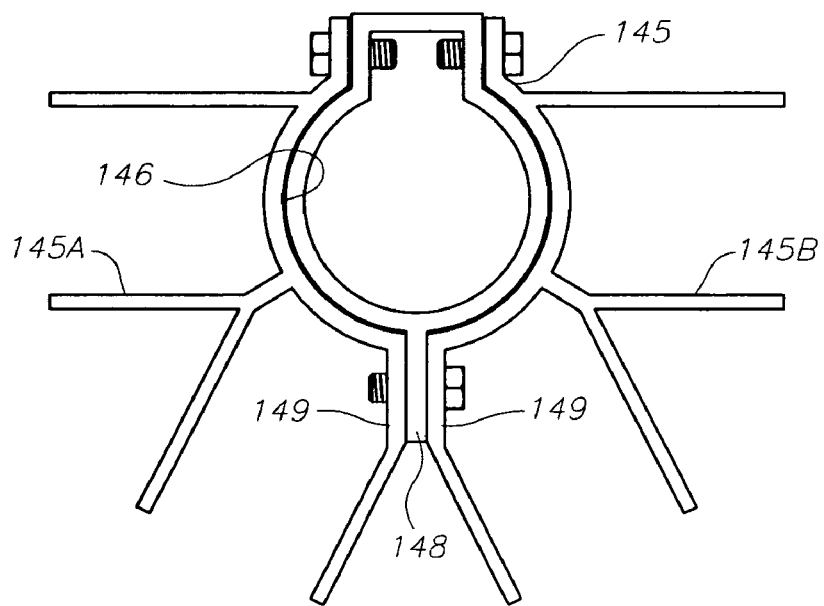
FIG. 31 is a cross-section view of a still further node connector according to the invention which is a variant of the node connector shown in FIG. 30 and in which the chord includes an external radial rib through which passes a bolt securing the connector parts to each other and to the chord.

The node connectors 69, 74 and 75 shown in FIGS. 6, 8 and 10 have tubular base portions 70 defining passages 71 which fully encircle the round tubular chords with which they cooperate. While it is desirable that the cross-sectional configuration of a node connector be such that, upon slidable insertion of a chord member into the connectors chord receiving passage, the connector and the chord member cooperate so that the chord member is held in the connector with its axis substantially aligned with the passage axis, that objective can be attained by a suitably designed node connector having a passage which does not fully circumferentially enclose the chord member. That is, the node connector's chord receiving passage need not fully enclose the chord member circumferentially in order that the node connector can receive the chord member from moving sideways in the node connector. That aspect of this invention is illustrated in FIGS. 29, 30, and 31.

Figure 29:
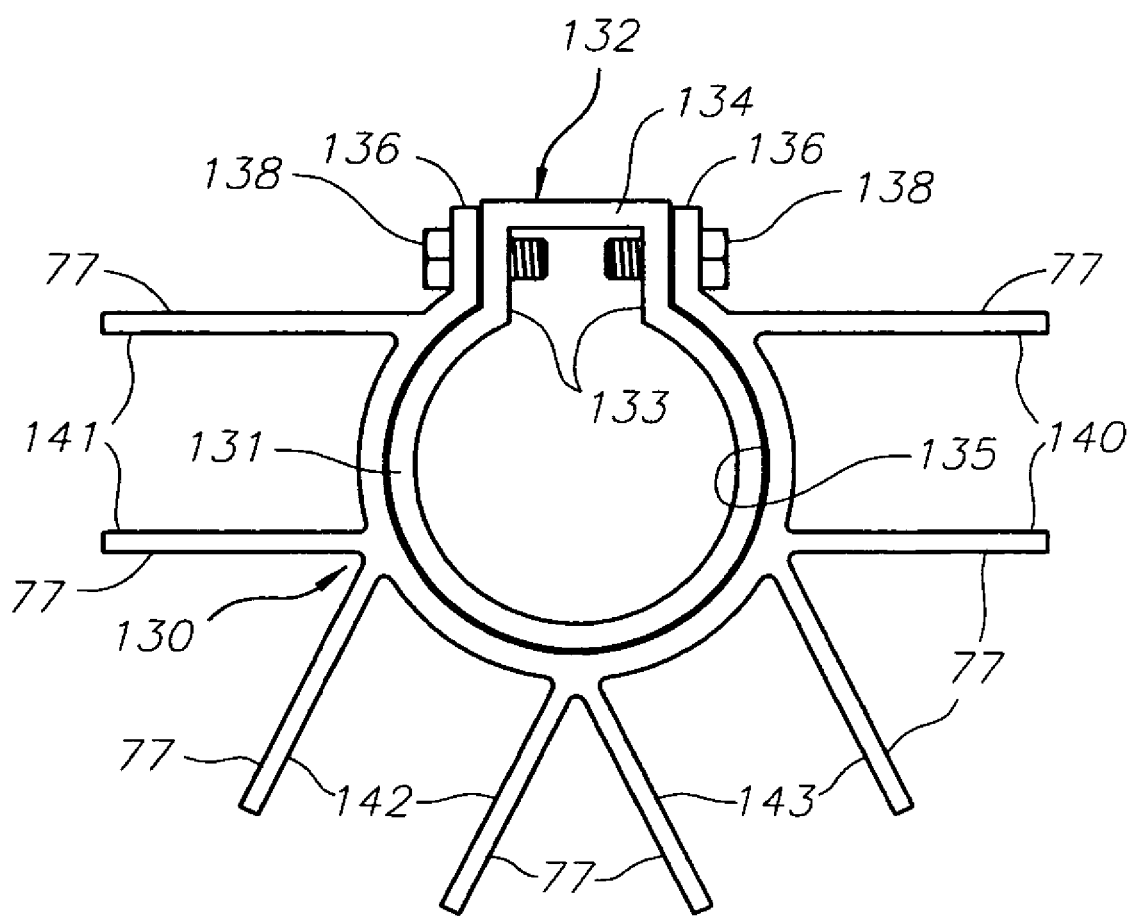
FIG. 29 is a cross-sectional view of another node connector according to the invention in which the connector's chord receiving passage is not fully closed but is sufficiently closed that the cooperation of the connector with a chord inserted axially into it holds the chord so that its axis is aligned with the passage axis and the chord can move only axially in the passage.

FIG. 29 is a transverse cross-section view of a node connector 130 which cooperates with a tubular chord member 131 of non-round cross-section. Chord member 131 is predominantly round in cross-section but has a lateral outward projection 132 which subtends about 90° of the circumference of the otherwise round chord member. The projection is comprised by a pair of short parallel outwardly extending flanges 133 which connect to the opposite ends of a flat web or bridge 134. The cross-section of the chord member is symmetrical about a plane through the axis (center of curvature) of the round portion of the chord tube and perpendicular to the plane of the bridge at the mid-length of the bridge. The cross-sectional configuration of the preferably extruded node connector 130 has a base portion of tubular nature defining a passage 135 which is sized and shaped so that, upon insertion of chord member 131 endwise into the passage, the passage surfaces cooperate closely with the outer surfaces of flanges 133 and the round major portion of the chord adequately to hold the chord in the connector in the desired way. Thus, the node connector has spaced parallel outwardly extending ribs 136 which cooperate with the outer surfaces of projection flanges 133, but between those ribs the passage has a lateral opening from it along its length to accommodate the chord member projection 132. The ends of ribs 136 lie in the plane of the top of projection 132 when the node connector and the chord member are engaged with each other.

The node connector 130 can be secured rigidly to chord member by passing shear pins through them adjacent to and parallel to the bottom of the chord member's bridge 133. Alternately, as shown in FIG. 29, the connection of the node connector to the chord member can be made by engaging bolts 138 through holes in the node connector ribs into tapped holes in the chord member flanges 131.

Node connector 130 and chord member 131 can be components in the upper layer of a classic flat DLG space frame of the kind shown in FIG. 1, as in an application of the space frame where the frame is to support decking or a roof arrangement. In that application, the chord member, due to its upward projection 132 along its length, has enhanced resistance to bending and so has properties akin to that of a beam. For use in such an application, outwardly extending elements (flanges) 77 present along the length of the node connector can define pairs of facing spaced parallel flat surfaces 140, 141, 142 and 143 for receiving transverse chords and struts of the frame. In each pair of surfaces, the facing surfaces can be equidistant from opposite sides of a center plane which includes the axis of passage 135. Surfaces 140 and 141 are parallel with respective ones of them coplanar; those surface pairs can receive and have pinned to them the adjacent ends of two co-linear transverse chords of the space frame. Surfaces 142 and 143 are angled out and down from each other; the elements defining those surface pairs can receive and have pinned between them ends of struts (two per surface pair) which interconnect to four different nodes in the other (bottom) layer of the space frame.

FIG. 30 is a cross-section view of a node connector 139 which is a variant of node connector 130 and of a chord member 131. It was noted above that node connector 130 has a plane of symmetry, namely a plane vertically through the center of curvature of the round portion of passage 135 as node connector 130 is depicted in FIG. 29. The variation of node connector 139 upon node connector 130 is that both have essentially the same cross-sectional configuration, but connector 139 is defined by two identical parts 139A and 139B which are connected together at the vertical plane of symmetry of connector 139. To enable parts 139A and 139B to be bolted together, as by bolts 140, each of parts 139A and 139B has an exterior flange or rib 141, from which one of elements 77 is carried, having a mating surface on the plane of symmetry of the assembled connector 139 and in which holes for bolts 140 are formed. Because parts 139A and 139B are identical in cross-section, they can be made from a common extrusion. The two-part node connector 139, e.g., is advantageous if the total cross-sectional area and dimension of the overall connector is large; there is a limited number of large extrusion presses in the world, and the two-part nature of connector 139 means that extrusions for use in its construction can be made on smaller extrusion presses of which there are many.

FIG. 31 is a cross-section view of a node connector 145 and a tubular chord member 146 which cooperate with each other; connector 145 is a modest variant of connector 139, and chord member 146 is a modest variant of chord member 131. The difference between the cross-sectional configurations of chord members 131 and 146 is that chord member 146 includes an external radial rib 148 along its length. The rib is centered on the plane of symmetry of the chord member. The difference between identical parts 145A and 145B of connector 145 relative to the parts 139A and 149B of connector 139 is that the ribs 149 of parts 145A and 145B are defined to mate with the opposite faces of chord member rib 148 rather than with each other. Because of the presence of its external rib 148, chord member 146 has enhanced beam properties over chord member 131.

Comment was made above that a variant of node connector 130 (FIG. 29), in which the passage through the length is a round circumferentially closed passage, can be used in the construction of a classic square frame (see FIG. 1) in which the longitudinal major chords are round and other framing members can be square, oval with external flats, or otherwise consistent with the preceding descriptions. Such a variant of node connector 130 can be used to define the "free form" or laterally curved DLG space frame 150 shown in FIGS. 32 (top plan view) and 33 (side elevation view), simply by making the upper and lower transverse chords 151 and 152 round and continuous through at least some of the frame nodes (splices may be needed) and by making the upper and lower longitudinal chord members 153 and 154 square and of lengths corresponding to the distance along a longitudinal chord line between adjacent nodes. The existence of an ability to construct such a laterally curved DLG space frame is shown by FIG. 33, a side elevation of such a frame, in which struts lie in diagonal planes extending across the width of the frame. The planes of the strut receiving surfaces 142 and 143 of such a node connector so disposed in the frame would be parallel to transverse chord lines, all of which are straight and uniformly spaced from each other along the length of the frame. Struts 155 connect between upper nodes 156 and lower nodes 157. Struts connected to a given node can have unequal lengths to accommodate the lateral displacements of adjacent transverse chord members needed to produce the laterally curved plan shape of the frame shown in FIG. 32.

Figure 32:
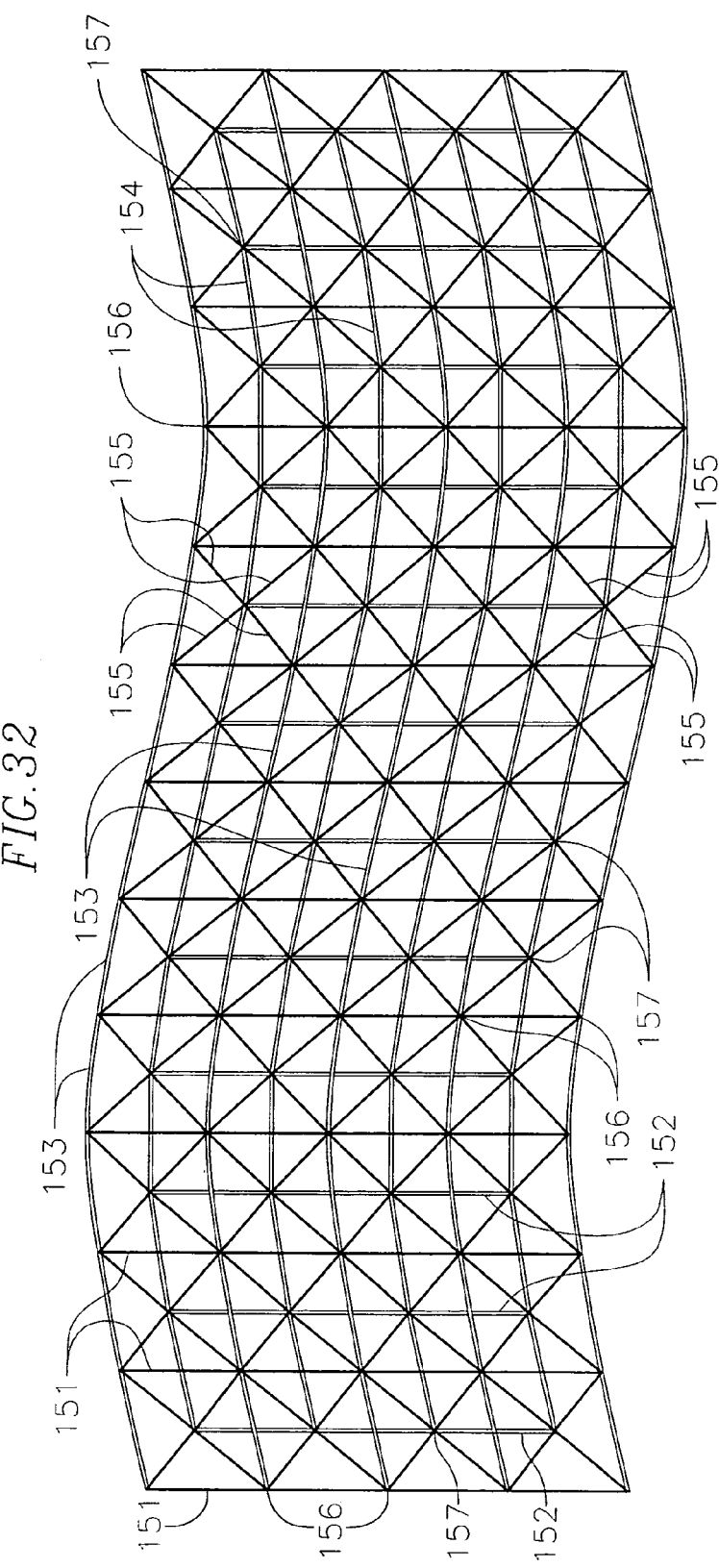
FIG. 32 is a schematic plan view of a "free form" DLG space frame which can be constructed using node connectors according to this invention.
Figure 33:
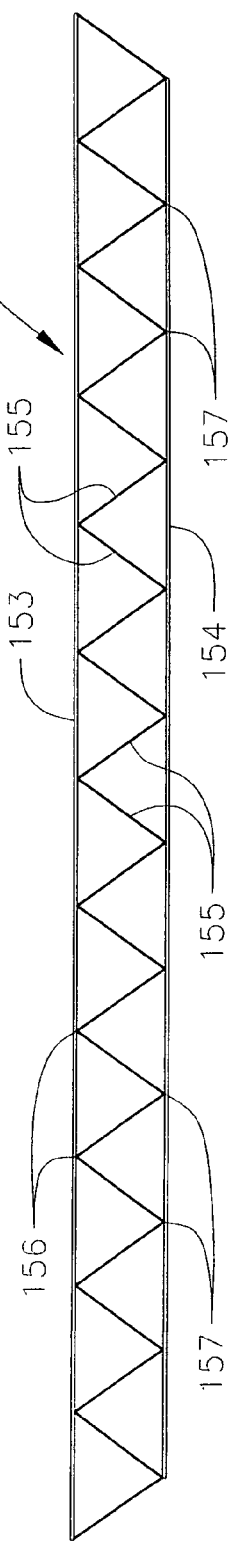
FIG. 33 is an elevation view taken along line 33-33 of FIG. 32.

41 It is apparent, therefore, that a node connector according to this invention, in which the parallel surfaces between which struts and discontinuous chord members are connected are surfaces which are parallel to the length of the passages in which a continuous chord member is received, is a node connector which can be used in a variety of differently configured DLG space frames, including frames which have uniform bay spacing longitudinally and transversely, space frames which have variable bay spacing longitudinally or transversely, and space frames in which longitudinal or transverse chord members are shifted laterally of each other as shown in FIG. 32.

Many benefits and advantages are afforded by this invention and its aspects and features described above. The node connectors enable certain chords of a DLG space frame to extend continuously though them. The node connectors can be used with space frame framing members of substantially any cross-sectional configuration desired; they are not limited to use with members having round or rectangular cross-sections. Node connectors and framing members can be extruded for low cost and dimensional precision. Node connectors and framing members can be made of materials having uniform metallurgical properties so that, among other benefits, space frames incorporating them are little affected dimensionally by temperature changes. The node connectors enable framing members of differing numbers, size and cross-sectional configuration to be effectively interconnected at a given node in a space frame. The node connectors can be defined to enable good, even ideal, positioning and alignment of framing members at a space frame node so that there are minimal or no eccentricities of framing member axes relative to each other at a node. The node connectors enable convenient use of variable bay spacing in a space frame, enabling the overall frame to efficiently carry design loads. The node connectors can be defined to provide interconnections between framing members in a diverse range of positions and numbers, thus enabling the use of DLG design and construction principles in more complex structures including non-static (movable) structures for electromagnetic radiation focusing applications such as movable mirror or reflector support armatures in solar power generation facilities and in radio and optical telescopes. Use-specific elements can be accommodated in space frames, such as mountings for solar reflectors, torque members, and other supports and accessories.

The zero-clearance shear pin connection aspects of this invention enable precision connections in space frames to be easily and inexpensively made, while also enabling other frame components to correctly perform assigned load carrying functions. Such connections can be disassembled and reassembled plural times while retaining desired levels of precision and tightness. The shear pins can be driven or turned into and out of installed positions in other members. Also, as explained with references to FIGS. 27 and 28, aspects of this invention enable minimum weight framing members to have enhanced axial load transmitting capabilities in pinned connections. The invention also enables a tubular structural element which is asymmetrical in X and Y directions to have equal (or other desired tailored) section moduli about those axes, thereby enabling weight saving thin wall tubes to be used to increased advantage in space frames.

The foregoing descriptions of depicted and other aspects of this invention are to be read as illustrative explanations to persons having skill in the relevant arts and technologies, not as an exhaustive catalog of all structural and procedural forms in which the invention can be embodied or used to advantage. Variations of the described structures and procedures can be used without departing from the fair scope of the invention.

What is claimed is:

1. A node connector useful at one of plural spaced apart nodes in a double layer grid-type of space frame for interconnecting at one of the nodes plural framing members of the frame, the frame having spaced major surfaces in which the nodes are located, the framing members including chord members which define the major surfaces and which extend between spaced apart node connectors and diagonal struts spacing the major surfaces from each other and optional torsion braces, each node having associated with it plural struts which extend to respective different nodes in the other surface of the frame, the node connector comprising a cylindrical base portion defining a passage having an axis and which is sized and shaped for snug slidable substantially axial insertion thereinto of an elongate chord framing member of the frame and which chord framing member has along its length an axis substantially alignable with the passage axis upon said insertion, the passage being configured to substantially enclose the chord framing member sufficiently to hold its axis in alignment with the passage axis upon such insertion, the node connector carrying substantially along the length of and externally of the base portion plural fixed-structural elements defining at least two pairs of parallel spaced substantially flat connection surfaces, the surfaces of each pair being spaced equidistantly from a center plane between them which is parallel to and substantially includes the passage axis, at least one pair of the surfaces having sufficient length along the connector to enable two diagonal struts to be connected to the connector via those surfaces, and at least one pair of holes through the elements which define each pair of surfaces for each framing member which is connectible to that node via the elements defining that pair of surfaces, the holes in each pair thereof being aligned on a respective line which is normal to the corresponding surfaces.

2. A node connector according to claim 1 in which the passage is circumferentially closed.

3. A node connector according to claim 2 in which the passage cross-sectional configuration is other than circularly round.

4. A node connector according to claim 2 in which the cross-sectional configuration of the connector is defined by at least one extrusion.

5. A node connector according to claim 4 in which the node connector material is aluminum.

6. A node connector according to claim 2 in which the cross-sectional configuration of the node connector is symmetrical about a plane which includes the passage axis, and the node connector is comprised by two substantially identical extrusions which are mated and fixedly connected to each other on the plane of symmetry.

7. A node connector according to claim 2 in which the connector material is fiber reinforced plastic.

8. A node connector according to claim 2 in which at least two adjacent ones of the flat surfaces are defined by an element which is branched into two arms, the arms defining the respective flat surfaces.

9. A node connector according to claim 2 in which two adjacent ones of the elements are commonly carried by a rib which extends along and outwardly from the exterior of the base portion of the connector.

10. A node connector according to claim 9 in which the rib is disposed substantially radially of the passage.

11. A node connector according to claim 2 in which the length along the connector of at least one pair of the flat surfaces is adequate to make connections to the connector of ends of at least three further framing members of the space frame.

12. A node connector according to claim 1 in which the passage cross-sectional configuration is other than circularly round.

13. A node connector according to claim 12 in which the passage has an opening laterally from it along the length of the passage, and the chord framing member is cross-sectionally configured to include a projecting portion thereof which is received in the opening upon insertion of the chord framing member into the passage.

14. A node connector according to claim 13 in which the node connector is securable from motion along a chord framing member inserted into it by a fastener engageable between the node connector and the projecting portion of the chord framing member.

15. A node connector according to claim 13 in which the cross-sectional configuration of the node connector is symmetrical about a plane which includes the passage axis and bisects the opening, and the node connector is comprised by two substantially identical parts which are mated and fixedly connected to each other on the plane of symmetry.

16. A node connector according to claim 1 in which the cross-sectional configuration of the connector is defined by a single extrusion.

17. A node connector according to claim 16 in which the node connector material is aluminum.

18. A node connector according to claim 1 in which the cross-sectional configuration of the node connector is symmetrical about a plane which includes the passage axis, and the node connector is comprised by two substantially identical extrusions which are mated and fixedly connected to each other on the plane of symmetry.

19. A node connector according to claim 1 in which the connector material is fiber reinforced plastic.

20. A node connector according to claim 1 in which at least two adjacent ones of the flat surfaces are defined by an element which is branched into at least two arms, the arms defining the respective flat surfaces.

21. A node connector according to claim 1 in which two adjacent ones of the elements are commonly carried by a rib which extends along and outwardly from the exterior of the base portion of the connector.

22. A node connector according to claim 21 in which the rib is disposed substantially radially of the passage.

23. A node connector according to claim 1 in which the length along the connector of at least one pair of the flat surfaces is adequate to make connections to the connector of ends of at least three framing members of the space frame.

24. A node connector useful at one of plural spaced apart nodes in a double layer grid-type of space frame for interconnecting at the one node plural framing members of the frame which extend between spaced apart nodes of the frame, the frame having spaced major surfaces in which the nodes are located, the framing members including longitudinal and transverse chord members which define the major surfaces and diagonal struts spacing the major surfaces from each other and optional torsion braces, each node having associated with it plural struts which extend to respective different nodes in the other surface of the frame, the node connector comprising an elongate body defining an open-ended circumferentially closed passage having an axis extending along the length of the body which is configured and sized to enable a longitudinal chord member to extend continuously through and beyond the body with the cooperation between the passage and the chord member holding a longitudinal axis of the chord member in substantial alignment with the passage axis, the node connector defining plural strut and transverse chord member connection surfaces extending laterally from the body substantially parallel to respective planes which intersect substantially centrally of the passage, the connection surfaces enabling struts and transverse chord members substantially disposed in respective ones of the planes to be connected to the node connector, and in which at least one of the connection surfaces associated with a particular diagonal plane has sufficient length along the body to enable a pair of struts to be connected to the body via that surface.

25. A node connector according to claim 24 in which the node connector defines a pair of spaced and substantially parallel connection surfaces in association with at least each diagonal plane pertinent to the node at which the node connector is to be located in the frame, the surfaces comprising each pair of surfaces being disposed on opposite sides of and substantially equidistantly from the respective diagonal plane.

26. A node connector according to claim 25 in which the node connector defines a pair of spaced and substantially parallel connection surfaces in association with each plane in which lies at least one non-longitudinal framing member having a connection to the frame node at which the node connector is to be located.

27. A node connector according to claim 24 in which the node connector has a substantially constant cross-sectional configuration in planes perpendicular to the length of the passage.

28. A node connector according to claim 24 in which the node connector passage cross-sectional shape is round.

29. A node connector according to claim 28 in which the node connector is defined in principal part as a single metal extrusion.

30. A node connector according to claim 24 in which such a node connector is present in the frame at all nodes associated with each longitudinal chord member, and in which the cross-sectional configuration of the node connectors associated with one of the longitudinal chord members is different from the cross-sectional configuration of the node connectors associated with at least one next-adjacent longitudinal chord member.

31. A node connector according to claim 1 in which the connector is defined essentially by a single article of manufacture as opposed to a plurality of interconnected articles.

* * * * *